(12) United States Patent
Varadarajan et al.

(10) Patent No.: US 8,259,824 B2
(45) Date of Patent: Sep. 4, 2012

(54) NESTED PRECODING CODEBOOK STRUCTURES FOR MIMO SYSTEMS

(75) Inventors: Badri Varadarajan, Mountain View, CA (US); Eko N. Onggosanusi, Allen, TX (US); Runhua Chen, Plano, TX (US); Il H. Kim, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1005 days.

(21) Appl. No.: 12/124,529

(22) Filed: May 21, 2008

(65) Prior Publication Data

US 2008/0292013 A1 Nov. 27, 2008

Related U.S. Application Data

(60) Provisional application No. 60/939,783, filed on May 23, 2007, provisional application No. 60/942,136, filed on Jun. 5, 2007, provisional application No. 60/942,244, filed on Jun. 6, 2007.

(51) Int. Cl.
*H04K 1/10* (2006.01)
(52) U.S. Cl. ..................................... 375/260
(58) Field of Classification Search ............ 375/259, 375/260, 267, 295, 296, 299, 316, 340, 346, 375/347; 455/91, 101, 114.2, 114.3, 132–135, 455/130, 269; 370/310, 343, 431, 437, 464, 370/480
See application file for complete search history.

(56) References Cited

U.S. PATENT DOCUMENTS

| 2004/0013180 | A1 | 1/2004 | Giannakis et al. |
| 2005/0250564 | A1* | 11/2005 | Kishigami et al. .......... 455/575.7 |
| 2007/0097856 | A1* | 5/2007 | Wang et al. .................... 370/210 |
| 2008/0188190 | A1* | 8/2008 | Prasad et al. ............... 455/114.3 |
| 2008/0272953 | A1* | 11/2008 | Zheng et al. .................. 341/173 |

FOREIGN PATENT DOCUMENTS

| EP | 1508992 A2 | 2/2005 |
| WO | 2004/039011 A2 | 5/2004 |

* cited by examiner

*Primary Examiner* — David C. Payne
*Assistant Examiner* — Vineeta Panwalkar
(74) *Attorney, Agent, or Firm* — Ronald O. Neerings; Wade James Brady, III; Frederick J. Telecky, Jr.

(57) ABSTRACT

Embodiments of the present disclosure provide a transmitter, a receiver and methods of operating a transmitter and a receiver. In one embodiment, the transmitter is for use with $N_T$ transmit antennas and includes a precoder unit configured to precode data for transmission using a preceding matrix selected from a nested codebook, wherein the nested codebook provides codebooks corresponding to different transmission layers that are derived from column subsets of multiple $N_T \times N_T$ preceding matrices. The transmitter also includes a transmit unit configured to transmit the precoded data. In another embodiment, the receiver includes a receive unit configured to receive preceded data. The receiver also includes a precoder selection unit configured to select a preceding matrix from a nested codebook for the preceded data, wherein the nested codebook provides codebooks corresponding to different transmission layers that are derived from column subsets of multiple $N_T \times N_T$ preceding matrices.

40 Claims, 3 Drawing Sheets

NESTED PRECODING CODEBOOK STRUCTURES FOR MIMO SYSTEMS

CROSS-REFERENCE TO PROVISIONAL APPLICATIONS

This application claims the benefit of U.S. Provisional Application No. 60/939,783 entitled "Four Antenna Codebook Design Based on DFT Matrix" to Badri Varadarajan, Eko N. Onggosanusi, Runhua Chen and Il Han Kim, filed on May 23, 2007, which is incorporated herein by reference in its entirety.

This application also claims the benefit of U.S. Provisional Application No. 60/942,136 entitled "Constant Modulus Householder-Based Codebook for Four Antenna System" to Badri Varadarajan, Eko N. Onggosanusi, Runhua Chen and Il Han Kim, filed on Jun. 5, 2007, which is incorporated herein by reference in its entirety.

This application additionally claims the benefit of U.S. Provisional Application No. 60/942,244 entitled "Constant Modulus Householder-Based Codebook for Four Antenna System (Update)" to Badri Varadarajan, Eko N. Onggosanusi, Runhua Chen and Il Han Kim, filed on Jun. 6, 2007, which is incorporated herein by reference in its entirety.

TECHNICAL FIELD

The present disclosure is directed, in general, to wireless communication systems and, more specifically, to Multiple-Input Multiple-Output communication employing a transmitter, a receiver and methods of operating the transmitter and receiver.

BACKGROUND

Multiple-input, multiple-output (MIMO) communication systems provide large increases in throughput due to their ability to support multiple, parallel data streams. These data streams are each transmitted from different spatial transmission layers, which employ either physical or virtual antennas. Generally, MIMO transmissions employ one or more parallel spatial streams that are forward error correction (FEC) encoded employing codewords. Each stream or codeword is then mapped to one or more transmission layers. Mapping of a single encoded stream to multiple layers may be simply achieved by distributing the encoded stream to all available layers. That is, the serial stream from the FEC encoding is converted to parallel streams on different layers. The number of spatial transmission layers employed is called the rank of the transmission.

The number of transmission layers used by a transmission may be any number up to the total number of physical antennas available. A signal on the virtual antennas is typically converted to a signal on the physical antennas by using linear precoding. Linear precoding consists of linearly combining the virtual antenna signals to obtain the actual signals to be transmitted. The effectiveness of a MIMO communication is dependent on the particular set of possible precoders (called a codebook) that may be used in the transmission. Although many current precoding codebooks exist, further improvements would prove beneficial in the art.

SUMMARY

Embodiments of the present disclosure provide a transmitter, a receiver and methods of operating a transmitter and a receiver. In one embodiment, the transmitter is for use with $N_T$ transmit antennas and includes a precoder unit configured to precede data for transmission using a preceding matrix selected from a nested codebook, wherein the nested codebook provides codebooks corresponding to different transmission layers that are derived from column subsets of multiple $N_T \times N_T$ preceding matrices. Additionally, the transmitter also includes a transmit unit configured to transmit the preceded data.

In another embodiment, the receiver includes a receive unit configured to receive preceded data. The receiver also includes a precoder selection unit configured to select a preceding matrix from a nested codebook for the preceded data, wherein the nested codebook provides codebooks corresponding to different transmission layers that are derived from column subsets of multiple $N_T \times N_T$ preceding matrices.

In another aspect, the present disclosure provides an embodiment of the method of operating the transmitter that is for use with $N_T$ transmit antennas and includes preceding data for transmission using a preceding matrix selected from a nested codebook, wherein the nested codebook provides codebooks corresponding to different transmission layers that are derived from column subsets of multiple $N_T \times N_T$ preceding matrices. The method also includes transmitting the preceded data.

The present disclosure also provides an embodiment of the method of operating the receiver that includes receiving preceded data selecting a preceding matrix from a nested codebook for the preceded data, wherein the nested codebook provides codebooks corresponding to different transmission layers that are derived from column subsets of multiple $N_T \times N_T$ preceding matrices.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION OF THE DRAWINGS

For a more complete understanding of the present disclosure, reference is now made to the following descriptions taken in conjunction with the accompanying drawings, in which.

DETAILED DESCRIPTION

Embodiments of the present disclosure employ a transmitter, which may operate in a base station (NodeB), and a receiver, which may operate in user equipment (UE), in a cellular network. The UE may feed back channel quality information to assist the transmitter in selecting transmission parameters. Often, several transmit parameters may be adapted based on feedback from the receiver. These adaptations may include rank adaptation, spatial transmission stream grouping, link adaptation and preceding adaptation.

A transmission rank is the number of spatial transmission streams employed in the transmitter. The transmission rank cannot exceed the number of physical transmit antennas available for use to the transmitter. To reduce feedback, it is desirable to reduce the number of spatial transmission streams (or equivalently, codewords) while maintaining the same rank. This can be done by grouping multiple virtual antennas into one spatial transmission stream. This is essentially a mapping from spatial streams to transmission layers. Link adaptation employs a modulation and coding scheme (MCS) of each spatial stream. This is determined by the channel quality indication for each spatial stream.

Mapping from virtual (i.e., transmission layers) to real antennas, called preceding, may be adapted to improve the channel quality of different streams. Preceding can be based on receiver feedback, or it can be done in a feedback-independent way by using a time-varying preceding pattern. Alternatively, it is also possible to exploit the property of the propagating channel to allow precoder adaptation in the absence of feedback. Such is possible for a time-division duplex (TDD) system where the uplink and downlink channels are reciprocal. Feedback-based adaptive preceding, however, applies to any duplexing scheme including frequency-division duplex (FDD).

Figure 1:
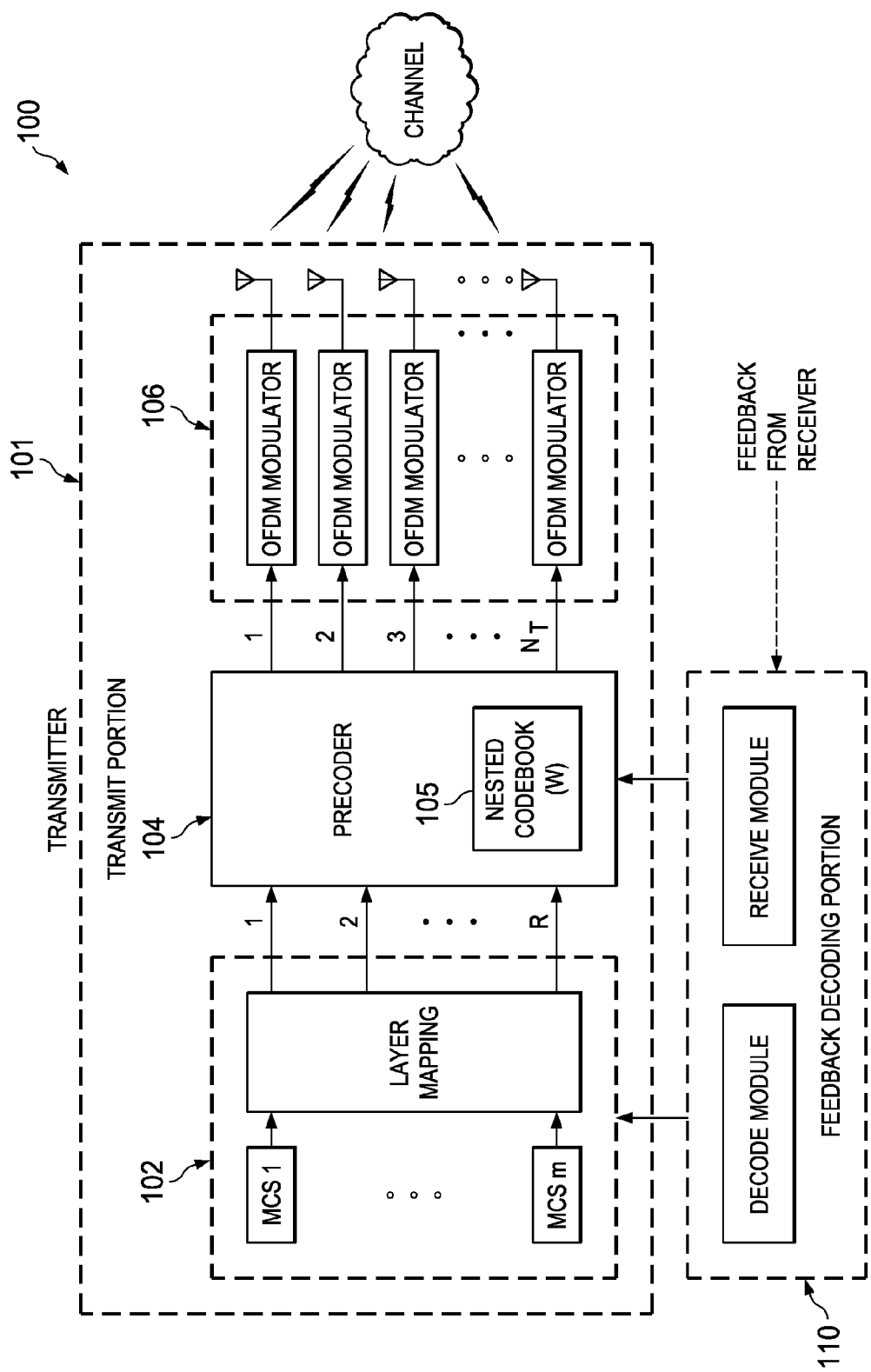
FIG. 1 illustrates a transmitter as provided by one embodiment of the disclosure.

FIG. 1 illustrates a transmitter 100 as provided by one embodiment of the disclosure. In general, the transmitter 100 employs a plurality $N_T$ of physical antennas whereas four physical antennas are used in examples discussed below. The transmitter 100 operates in an OFDM communication environment although the principles of the present disclosure may be employed in other communication systems. The transmitter 100 includes a transmission portion 101 and a feedback decoding portion 110. The transmission portion 101 includes a modulation, encoding and layer mapping unit 102, a precoder unit 104 and a transmit unit 106 having multiple OFDM modulators that feed corresponding transmit antennas. The feedback decoding portion 110 includes a receive module and a decoder module.

Generally, the precoder unit 104 is configured to precede data for transmission using a preceding matrix selected from a nested codebook 105, wherein the nested codebook 105 provides codebooks corresponding to different transmission layers that are derived from column subsets of multiple $N_T \times N_T$ preceding matrices. The transmit unit 106 is configured to transmit the preceded data.

In the illustrated embodiment, the feedback decoding portion 110 recovers a channel quality indicator (CQI) report from user equipment (UE), which is used to determine a preceding matrix index for each time-frequency resource block by the precoder unit 104. Data are generated and encoded for each symbol stream and transmitted by the transmit unit 106, and the corresponding transmit antennas. The encoded streams are grouped by mapping one spatial stream to multiple spatial layers (in the form of virtual antennas) wherein the number of active virtual antennas is given by a transmission rank R. By performing encoding and layer mapping, the transmit signal on each transmission layer is assembled.

The precoder unit 104 employs the nested codebook 105 to convert the signal on the R virtual antennas to the four physical antennas. Embodiments of the precoders presented are linear. That is, the signal on each of the physical antennas is some linear combination of the signals on the virtual antennas. Thus the mapping can be specified by a linear preceding matrix. The output of the precoder unit 104 contains signals to be transmitted on the physical antennas.

In the embodiment shown, the signal is assembled in the frequency domain and converted to the time domain using the OFDM modulators, which can add a cyclic prefix to guard against channel distortion. The specific OFDM modulation is just an example for the various kinds of modulation schemes that may be used to send the precoder unit 104 outputs on the channel. Other examples include code-division multiple access (CDMA) and time-division multiple access (TDMA) transmissions, where the signal is transmitted in the code and time domains, respectively.

Figure 2:
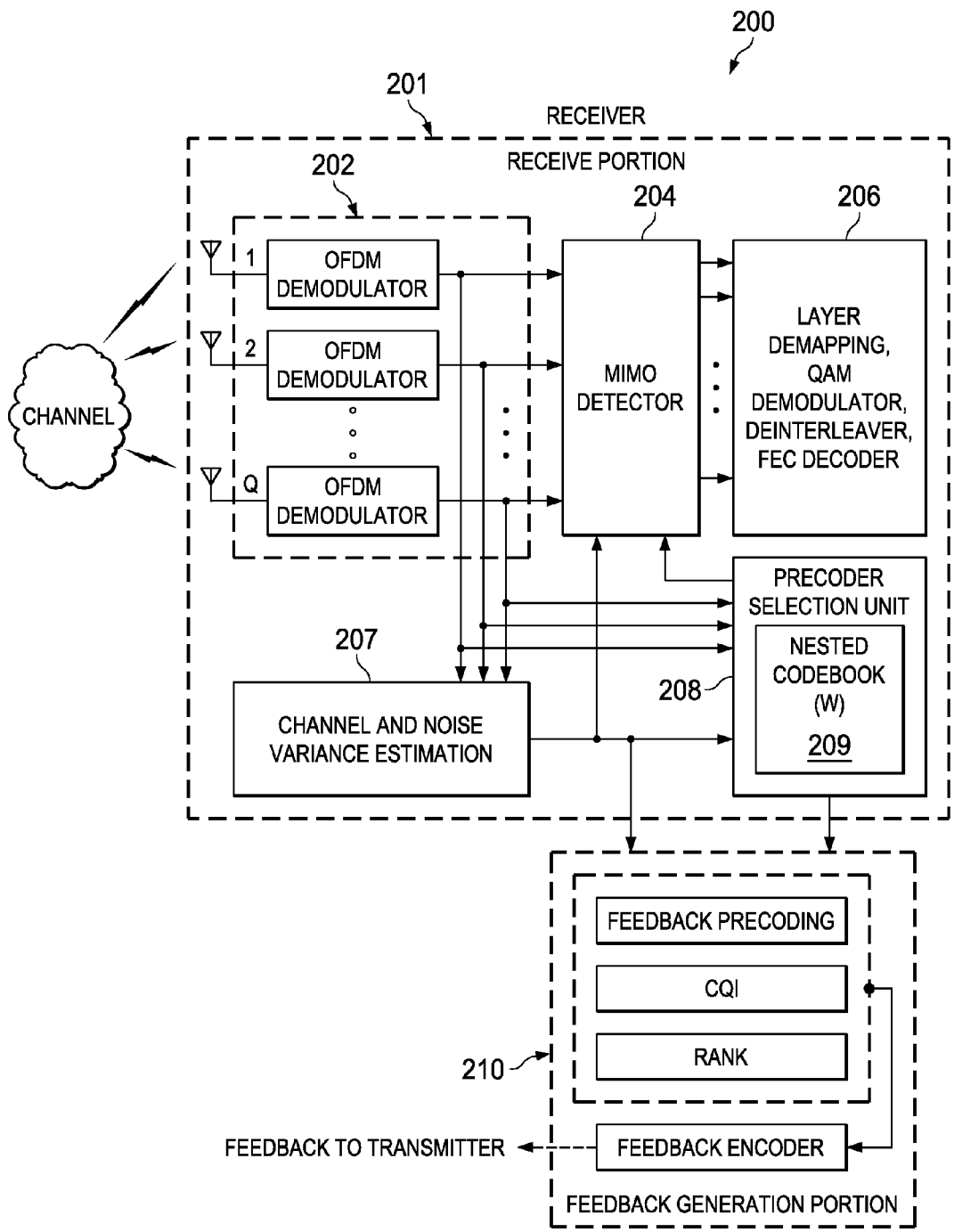
FIG. 2 illustrates a receiver as provided by a corresponding embodiment of the disclosure.

FIG. 2 illustrates a receiver 200 as provided by a corresponding embodiment of the disclosure. The receiver 200 includes a receive portion 201 and a feedback generation portion 210. The receive portion 201 includes a receive unit 202, a MIMO detector unit 204, a signal processing unit 206, a channel and noise variance unit 207 and a precoder selection unit 208. OFDM demodulation in the receive unit 202 is followed by channel estimation in the channel and noise variance unit 207, which enables precoder selection in the precoder selection unit 208. The precoder selection unit 208 includes a nested codebook 209.

Generally, the receive unit 202 is configured to receive preceded data, and the precoder selection unit 208 is configured to select a preceding matrix from the nested codebook 209 for the received preceded data. The nested codebook 209 provides codebooks corresponding to different transmission layers that are derived from column subsets of multiple $N_T \times N_T$ preceding matrices.

The receiver 200 determines, among other things, a transmission rank and precoder index used by a transmitter (such as the transmitter 100) for each time-frequency resource. This may be done by decoding one or more control signals, in addition to optionally using the stored nested codebook 209. From the precoder index, the receiver 200 then determines the preceding matrix used from the nested codebook 209. This knowledge is used by the MIMO detector 204 to generate soft information for each transmission layer, which is then subsequently processed to decode the various coded streams.

The feedback generation portion 210 uses channel and noise variance estimates to assemble a CQI report. In this embodiment, this includes employing a rank selector to provide a recommended rank and the preferred precoder index from the nested codebook 209 corresponding to preceding selection of a preferred rank. Additionally, CQI for the corresponding transmission layers and coded streams is provided. These quantities are then fed back to the transmitter using a feedback encoder.

Different transmission ranks use different preceding codebooks. To enable the receiver 200 to correctly decode the signal, the preceding matrix in many communication systems (e.g., E-UTRA, IEEE 802.16e, E-UTRA HSPA) is drawn from a finite codebook. There is a trade-off in the choice of the codebook size. Increasing the codebook size allows better tuning of the precoder matrix to improve the signal-to-interference plus noise ratio (SINR) seen by the transmission layers, and hence to increase downlink throughput. However, a larger codebook size also increases the amount of feedback and downlink control signaling to indicate the preferred or actual precoder index. Also, the UE might need to compute an optimum preceding matrix based on channel and noise variance estimates.

Referring jointly to FIGS. 1 and 2, comprehensive examples of nested codebooks employing discrete Fourier Transform-based (DFT-based) and Householder-based matrices are presented below.

In the examples of 4-antenna DFT-based codebooks, a uniform diagonal rotation matrix is used. For example, the diagonal rotation matrix may be given by equation (1) below.

$$D_n = \text{diag}(1, \exp(j\theta n), \exp(j2\theta n), \exp(j3\theta n)), n = 0, 1, \ldots, N-1 \quad (1)$$

Here, N is the number of 4×4 matrices that are used for the rank-4 codebook, which results in a total of 4N elements in corresponding rank-1 and rank-3 codebooks as well as 6N elements in a corresponding rank-2 codebook. For each rank, a subset of the available elements can be chosen to construct a codebook of an arbitrary (smaller) size. For example, 2N elements in the rank-2 codebook can be discarded to generate a rank-2 codebook of size 4N. A typical value of θ is $$\frac{\pi}{2N},$$

which results in a uniform "sampling" of the unit circle.

A drawback of this design is apparent for N>2, since a larger alphabet size results (e.g., a 16PSK alphabet). This also requires the use of multiplication in the codebook selection. To minimize the complexity impact, a smaller alphabet size, such as QPSK (±1,±j), is preferred since it does not require multiplication. Some 8PSK components $$\left(\frac{\pm 1 \pm j}{\sqrt{2}}\right)$$

may also be used, if necessary. In addition to the finite alphabet property, a constant modulus property is also desired to minimize the impact of power amplifier imbalance. Some characteristics of the DFT-based codebook embodiments follow.

The rank-4 codebook may be generated from the N (4×4) rotated DFT matrices generated by multiplying the 4×4 DFT matrix with N diagonal matrices. The diagonal elements are chosen from a smaller finite alphabet size such as QPSK or 8PSK and need not correspond to uniform diagonal rotation. Note that this design ensures the constant modulus property.

The codebooks for the lower ranks (1, 2 or 3) are generated from the column subsets of the N elements in the rank-4 codebook. That is:

1) For the Rank-1 codebook, 4N elements are available;
2) For the Rank-2 codebook, 6N elements are available; and
3) For the Rank-3 codebook, 4N elements are available.

For each rank (1, 2 or 3), a subset of the available elements can be selected to generate a codebook with a smaller size. The design may be optimized based on a certain criterion or a set of criteria (such as maximizing minimum chordal or Fubini distance for each rank, maximum overall throughput etc.). The following may be optimized.

1) The elements of the N diagonal rotation matrices; and
2) If subset selection is performed (not all the available elements are used), the subset may also be optimized.

The nested property across ranks is beneficial to accommodate rank override. For each pre-coder matrix in a certain rank (2, 3 or 4), there exists at least one corresponding column subset in all the codebooks of the lower ranks. This is adherent to the current working assumption. In addition, a nested property facilitates lower computational complexity due to the extensive reuse across ranks.

Three DFT-based design examples are provided below. The optimization criterion employed maximizes the minimum chordal distance for rank 1, 2 and 3 codebooks. All the examples satisfy the nested property. Example one is restricted to the QPSK alphabet. Example two provides one 4×4 matrix that may have 8PSK components along with the corresponding lower rank codebooks thereof. Example three provides two 4×4 matrices that may have 8PSK components along with the corresponding lower rank codebooks thereof. The addition of some 8PSK components is intended to improve the performance in highly correlated channels.

All examples are based on N=4 and assume size-16 codebooks for rank 1, 2 and 3. Hence, some subset selection (16 out of 24) is performed for the rank-2 codebook. The subset selection is performed to optimize the minimum chordal distance while enforcing the nested property.

In Codebook 1, the codeword matrices are:

$$W_1 = 0.5 * \begin{bmatrix} 1 & 1 & 1 & 1 \\ 1 & j & -1 & -j \\ 1 & -1 & 1 & -1 \\ 1 & -j & -1 & j \end{bmatrix}, \quad (2)$$

$$W_2 = \text{diag}(1, 1, -1, -1) * W_1 = 0.5 * \begin{bmatrix} 1 & 1 & 1 & 1 \\ 1 & j & -1 & -j \\ -1 & 1 & -1 & 1 \\ -1 & j & 1 & -j \end{bmatrix}, \quad (3)$$

$$W_3 = \text{diag}(1, 1, -1, 1) * W_1 = 0.5 * \begin{bmatrix} 1 & 1 & 1 & 1 \\ 1 & j & -1 & -j \\ 1 & -1 & 1 & -1 \\ -1 & j & 1 & -j \end{bmatrix}, \text{ and} \quad (4)$$

$$W_4 = \text{diag}(1, j, -1, j) * W_1 = 0.5 * \begin{bmatrix} 1 & 1 & 1 & 1 \\ j & -1 & -j & 1 \\ -1 & 1 & -1 & 1 \\ j & 1 & -j & -1 \end{bmatrix}. \quad (5)$$

Table CB1 below summarizes the results wherein Matrix1, Matrix2, Matrix3 and Matrix4 below correspond to equations (2), (3), (4) and (5), respectively.

TABLE CB1

| Precoder Index | Rank 1 | Rank 2 | Rank 3 |
|---|---|---|---|
| 1 | Matrix1, column1 | Matrix1, column{1, 2} | Matrix1, column{1, 2, 3} |
| 2 | Matrix1, column2 | Matrix1, column{1, 3} | Matrix1, column{1, 2, 4} |
| 3 | Matrix1, column3 | Matrix1, column{1, 4} | Matrix1, column{1, 3, 4} |
| 4 | Matrix1, column4 | Matrix1, column{2, 3} | Matrix1, column{2, 3, 4} |
| 5 | Matrix2, column1 | Matrix1, column{2, 4} | Matrix2, column{1, 2, 3} |
| 6 | Matrix2, column2 | Matrix1, column{3, 4} | Matrix2, column{1, 2, 4} |
| 7 | Matrix2, column3 | Matrix2, column{1, 2} | Matrix2, column{1, 3, 4} |
| 8 | Matrix2, column4 | Matrix2, column{1, 4} | Matrix2, column{2, 3, 4} |
| 9 | Matrix3, column1 | Matrix2, column{2, 3} | Matrix3, column{1, 2, 3} |
| 10 | Matrix3, column2 | Matrix2, column{3, 4} | Matrix3, column{1, 2, 4} |
| 11 | Matrix3, column3 | Matrix3, column{1, 2} | Matrix3, column{1, 3, 4} |

TABLE CB1-continued

| Precoder Index | Rank 1 | Rank 2 | Rank 3 |
|---|---|---|---|
| 12 | Matrix3, column4 | Matrix3, column{1, 3} | Matrix3, column{2, 3, 4} |
| 13 | Matrix4, column1 | Matrix3, column{1, 4} | Matrix4, column{1, 2, 3} |
| 14 | Matrix4, column2 | Matrix3, column{2, 3} | Matrix4, column{1, 2, 4} |
| 15 | Matrix4, column3 | Matrix4, column{1, 2} | Matrix4, column{1, 3, 4} |
| 16 | Matrix4, column4 | Matrix4, column{3, 4} | Matrix4, column{2, 3, 4} |

The minimum chordal distances for each rank are Rank 1: 0.7071, Rank 2: 1.0000 and Rank 3: 0.7071.

In Codebook 2, the codeword matrices are:

$$W_1 = 0.5 * \begin{bmatrix} 1 & 1 & 1 & 1 \\ 1 & j & -1 & -j \\ 1 & -1 & 1 & -1 \\ 1 & -j & -1 & j \end{bmatrix}, \quad (6)$$

$$W_2 = \text{diag}(1, 1, 1, -1) * W_1 = 0.5 * \begin{bmatrix} 1 & 1 & 1 & 1 \\ 1 & j & -1 & -j \\ 1 & -1 & 1 & -1 \\ -1 & j & 1 & -j \end{bmatrix}, \quad (7)$$

$$W_3 = \text{diag}(1, 1, j, -j) * W_1 = 0.5 * \begin{bmatrix} 1 & 1 & 1 & 1 \\ 1 & j & -1 & -j \\ j & -j & j & -j \\ -j & -1 & j & 1 \end{bmatrix}, \text{ and} \quad (8)$$

$$W_4 = \text{diag}\left(1, \frac{1+j}{\sqrt{2}}, -j, \frac{1+j}{\sqrt{2}}\right) * W_1 \quad (9)$$

$$= 0.5 * \begin{bmatrix} 1 & 1 & 1 & 1 \\ \frac{1+j}{\sqrt{2}} & \frac{-1+j}{\sqrt{2}} & \frac{-1-j}{\sqrt{2}} & \frac{1-j}{\sqrt{2}} \\ -j & j & -j & j \\ \frac{1+j}{\sqrt{2}} & \frac{1-j}{\sqrt{2}} & \frac{-1-j}{\sqrt{2}} & \frac{-1+j}{\sqrt{2}} \end{bmatrix}.$$

Table CB2 below summarizes the results wherein Matrix1, Matrix2, Matrix3 and Matrix4 below correspond to equations (6), (7), (8) and (9), respectively.

TABLE CB2

| Precoder Index | Rank 1 | Rank 2 | Rank 3 |
|---|---|---|---|
| 1 | Matrix1, column1 | Matrix1, column{1, 2} | Matrix1, column{1, 2, 3} |
| 2 | Matrix1, column2 | Matrix1, column{1, 3} | Matrix1, column{1, 2, 4} |
| 3 | Matrix1, column3 | Matrix1, column{1, 4} | Matrix1, column{1, 3, 4} |
| 4 | Matrix1, column4 | Matrix1, column{2, 3} | Matrix1, column{2, 3, 4} |
| 5 | Matrix2, column1 | Matrix1, column{2, 4} | Matrix2 column{1, 2, 3} |
| 6 | Matrix2, column2 | Matrix1, column{3, 4} | Matrix2, column{1, 2, 4} |
| 7 | Matrix2, column3 | Matrix2, column{1, 2} | Matrix2 column{1, 3, 4} |
| 8 | Matrix2, column4 | Matrix2, column{1, 3} | Matrix2 column{2, 3, 4} |
| 9 | Matrix3, column1 | Matrix2, column{1, 4} | Matrix3, column{1, 2, 3} |
| 10 | Matrix3, column2 | Matrix2, column{2, 3} | Matrix3, column{1, 2, 4} |
| 11 | Matrix3, column3 | Matrix2, column{2, 4} | Matrix3, column{1, 3, 4} |
| 12 | Matrix3, column4 | Matrix2, column{3, 4} | Matrix3, column{2, 3, 4} |
| 13 | Matrix4, column1 | Matrix3, column{1, 3} | Matrix4, column{1, 2, 3} |
| 14 | Matrix4, column2 | Matrix3, column{2, 4} | Matrix4, column{1, 2, 4} |
| 15 | Matrix4, column3 | Matrix4, column{1, 2} | Matrix4, column{1, 3, 4} |
| 16 | Matrix4, column4 | Matrix4, column{3, 4} | Matrix4, column{2, 3, 4} |

The minimum chordal distances for each rank are Rank 1: 0.7071, Rank 2: 1.0000 and Rank 3: 0.7071.

In Codebook 3, the codeword matrices are:

$$W_1 = 0.5 * \begin{bmatrix} 1 & 1 & 1 & 1 \\ 1 & j & -1 & -j \\ 1 & -1 & 1 & -1 \\ 1 & -j & -1 & j \end{bmatrix}, \quad (10)$$

$$W_2 = \text{diag}(1, -1, 1, 1) * W_1 = 0.5 * \begin{bmatrix} 1 & 1 & 1 & 1 \\ -1 & -j & 1 & j \\ 1 & -1 & 1 & -1 \\ 1 & -j & -1 & j \end{bmatrix}, \quad (11)$$

$$W_3 = \text{diag}\left(1, \frac{-1-j}{\sqrt{2}}, -j, \frac{1+j}{\sqrt{2}}\right) * W_1 \quad (12)$$

$$= 0.5 * \begin{bmatrix} 1 & 1 & 1 & 1 \\ \frac{-1-j}{\sqrt{2}} & \frac{1-j}{\sqrt{2}} & \frac{1+j}{\sqrt{2}} & \frac{-1+j}{\sqrt{2}} \\ -j & j & -j & j \\ \frac{1+j}{\sqrt{2}} & \frac{1-j}{\sqrt{2}} & \frac{-1-j}{\sqrt{2}} & \frac{-1+j}{\sqrt{2}} \end{bmatrix}, \text{ and}$$

$$W_4 = \text{diag}\left(1, \frac{-1-j}{\sqrt{2}}, -j \frac{-1-j}{\sqrt{2}}\right) * W_1 \quad (13)$$

$$= 0.5 * \begin{bmatrix} 1 & 1 & 1 & 1 \\ \frac{-1-j}{\sqrt{2}} & \frac{1-j}{\sqrt{2}} & \frac{1+j}{\sqrt{2}} & \frac{-1+j}{\sqrt{2}} \\ -j & j & -j & j \\ \frac{-1-j}{\sqrt{2}} & \frac{-1+j}{\sqrt{2}} & \frac{1+j}{\sqrt{2}} & \frac{1-j}{\sqrt{2}} \end{bmatrix}.$$

Table CB3 below summarizes the results wherein Matrix1, Matrix2, Matrix3 and Matrix4 below correspond to equations (10), (11), (12) and (13), respectively.

TABLE CB3

| Precoder Index | Rank 1 | Rank 2 | Rank 3 |
|---|---|---|---|
| 1 | Matrix1, column1 | Matrix1, column{1, 2} | Matrix1, column{1, 2, 3} |
| 2 | Matrix1, column2 | Matrix1, column{1, 3} | Matrix1, column{1, 2, 4} |
| 3 | Matrix1, column3 | Matrix1, column{1, 4} | Matrix1, column{1, 3, 4} |
| 4 | Matrix1, column4 | Matrix1, column{2, 3} | Matrix1, |

TABLE CB3-continued

| Precoder Index | Rank 1 | Rank 2 | Rank 3 |
|---|---|---|---|
| 5 | Matrix2, column1 | Matrix1, column{2, 4} | Matrix2, column{2, 3, 4} |
| 6 | Matrix2, column2 | Matrix1, column{3, 4} | Matrix2, column{1, 2, 3} |
| 7 | Matrix2, column3 | Matrix2, column{1, 2} | Matrix2, column{1, 2, 4} |
| 8 | Matrix2, column4 | Matrix2, column{1, 3} | Matrix2, column{1, 3, 4} |
| 9 | Matrix3, column1 | Matrix2, column{1, 4} | Matrix2, column{2, 3, 4} |
| 10 | Matrix3, column2 | Matrix2, column{2, 3} | Matrix3, column{1, 2, 3} |
| 11 | Matrix3, column3 | Matrix2, column{2, 4} | Matrix3, column{1, 2, 4} |
| 12 | Matrix3, column4 | Matrix2, column{3, 4} | Matrix3, column{1, 3, 4} |
| 13 | Matrix4, column1 | Matrix3, column{1, 2} | Matrix3, column{2, 3, 4} |
| 14 | Matrix4, column2 | Matrix3, column{3, 4} | Matrix4, column{1, 2, 3} |
| 15 | Matrix4, column3 | Matrix4, column{1, 2} | Matrix4, column{1, 2, 4} |
| 16 | Matrix4, column4 | Matrix4, column{3, 4} | Matrix4, column{1, 3, 4} |
|  |  |  | Matrix4, column{2, 3, 4} |

The minimum chordal distances for each rank are Rank 1: 0.7906, Rank 2: 1.0000, and Rank 3: 0.7906.

The use of a one-step Householder transformation may be shown to be effective in generating codebook candidates, especially for 4-antenna systems, in terms of performance and complexity. Other features that can be incorporated in the Householder-based design are provided below.

Low complexity codebook design can be attained by choosing the elements of each matrix or vector from a small set. Examples of the small set are the QPSK $\{\pm 1, \pm j\}$ and 8PSK $\{\pm 1, \pm j, \pm 1, \pm j\}$ alphabet sets. The use of QPSK or 8PSK alphabets sets avoids the need for computing matrix or vector multiplication.

Codebook design employing a constant modulus property is beneficial for avoiding unnecessary increase in PAPR thereby ensuring the balance in power amplifier stages. The nested property across ranks is beneficial to accommodate rank override. For each precoder matrix in a certain rank (2, 3 or 4), there exists at least one corresponding column subset in all the codebooks of the lower ranks.

The codebook may be designed to perform well in a variety of channel scenarios (e.g., high and low angular spreads, varying angle of departures and arrivals, etc.) as well as antenna setups (single and dual polarized, small and large spacing, antenna orientations, etc.). In embodiments of this disclosure, improvement and refinement are provided on the design of Householder-based codebook with the above properties.

The Householder-based codebook design may be characterized by a set of generating vectors u and the column subset S. $H(u, S)$ is the $4 \times N$ sub-matrix of the $4 \times 4$ Householder matrix $$H(u) = I_4 - \frac{2}{\|u\|^2} u u^H$$

associated with the column set S of length N. The following features and criteria are incorporated into the embodiments in addition to the constraints discussed above.

Design should be optimized based on a certain criterion or a set of criteria (e.g., maximizing minimum chordal or Fubini distance for each rank, distance spectrum, maximum overall throughput, Frobenius norm of the effective channel after pre-coding, etc.). The set of generating vectors or the column subset may be optimized.

A "downward" nested property facilitates lower computational complexity due to extensive reuse across ranks. In addition, an "upward" nested property can also be ensured to increase the computational reuse across ranks.

While different channel scenarios and antenna configurations result in different spatial characteristics, the resulting spatial channels can be categorized into the two classes of low spatial correlation and high spatial correlation. Typically, the performance in low correlated channels corresponds well with the codebook distance property (e.g., minimum chordal distance or chordal distance distribution, which implicitly assumes an isotropic channel).

On the other hand, the performance in highly correlated channel does not correspond well with such distance metrics. While different metrics can be used to measure the performance in correlated channels, satisfactory performance can be obtained by ensuring good array gain response for the rank-1 case. A sufficient condition for such is to include uniform linear array (ULA) vectors in the rank-1 codebook. For 4-transmit antennas, the ULA vectors can be written as shown in equation (1) below.

$$v_k = \frac{1}{2} \begin{bmatrix} 1 \\ \exp\left(\frac{j\pi k}{4}\right) \\ \exp\left(\frac{j\pi k}{2}\right) \\ \exp\left(\frac{j3\pi k}{4}\right) \end{bmatrix}, k = 0, 1, \ldots, 7. \quad (14)$$

Note that equation (14) gives eight overlapping and non-orthogonal ULA vectors. While the four orthogonal ULA vectors (corresponding to k=0, 2, 4, 6 or k=1, 3, 5, 7) may be sufficient, including all eight ULA vectors will be beneficial to ensure competitive performance in highly correlated channels.

The eight ULA vectors can be included in the rank-1 codebook by various ways. A first example includes deriving eight Householder matrices such that the first column of each matrix corresponds to one of the eight ULA vectors. Due to the constant modulus property for each of the rank-1 vectors, it may be shown that for 4-transmit antennas, the corresponding generating vector can be obtained as follows in equation (15) below.

Based on the Householder matrices, the corresponding rank-2 and rank-3 codebooks can be derived by selecting the column subsets of the Householder matrices. The Householder matrices can be used to form the rank-4 codebook. Hence, from eight ULA vectors eight Householder matrices may be obtained.

$$v_k = \begin{bmatrix} v_k(1) \\ v_k(2) \\ v_k(3) \\ v_k(4) \end{bmatrix} = \frac{1}{2} \begin{bmatrix} 1 \\ \exp(j\theta_1) \\ \exp(j\theta_2) \\ \exp(j\theta_3) \end{bmatrix} \rightarrow u_k = \frac{1}{2} \begin{bmatrix} 1 \\ -\exp(j\theta_1) \\ -\exp(j\theta_2) \\ -\exp(j\theta_3) \end{bmatrix} \quad (15)$$

The following two DFT matrices in equation (16) can be included in the rank-4 codebook. The lower rank codebooks (1, 2 and 3) are generated from selecting the column subsets of the two DFT matrices. The eight ULA vectors may then be obtained and included in the rank-1 codebook. For one DFT matrix, at most six matrices can be generated for rank-2 and at most four matrices can be generated from rank-3. This is equivalent to performing virtual antenna selection based on the matrices given in equation (16).

$$F_0 = \frac{1}{2} \times \begin{bmatrix} 1 & 1 & 1 & 1 \\ 1 & j & -1 & -j \\ 1 & -1 & 1 & -1 \\ 1 & -j & -1 & j \end{bmatrix} \quad (16)$$

$$F_1 = \frac{1}{2} \times \begin{bmatrix} 1 & 0 & 0 & 0 \\ 0 & \exp(\frac{j\pi}{4}) & 0 & 0 \\ 0 & 0 & j & 0 \\ 0 & 0 & 0 & \exp(\frac{j\pi}{4}) \end{bmatrix} \begin{bmatrix} 1 & 1 & 1 & 1 \\ 1 & j & -1 & -j \\ 1 & -1 & 1 & -1 \\ 1 & -j & -1 & j \end{bmatrix}$$

The combination or hybrid of the discussions associated with equations (14) and (15) may be used. That is, for the four ULA vectors (e.g., k even in equation (14), which has a QPSK alphabet), one of the DFT matrices (e.g., $F_0$ in equation (16) may be used). For the other four ULA vectors (e.g., k odd on equation (14) which has an 8PSK alphabet), the Householder generation of equation (14) may be used.

Note that the approach employing equation (15) results in a one-to-one correspondence for the precoders across all the different ranks. This results in the same codebook size for the different ranks. Alternatively, it is possible to reduce the size of the rank-4 codebook (since preceding gain for rank-4 is rather limited) by using one generating vector (and hence one Householder matrix) to generate at most six rank-2 matrices and at most four rank-3 matrices by using column subset selection.

This is equivalent to performing virtual antenna selection based on a Householder matrix. This offers another freedom for codebook design. Based on the above criteria, the following combinations can be obtained when designing size-16 Householder-based codebooks.

$N_4$ Householder generating vectors ($N_4$=1,2,3,4) generate four matrices for rank 1 and 3. Rank-2 matrices are chosen to ensure the nested property. The remaining can be designed based on the one-to-one correspondence as mentioned before (Size-16 for rank-1, 2, and 3 and size-(16-3$N_4$) for rank-4, (16-3$N_4$) generating vectors).

For full usage of Householder, one generating vector generates one matrix for all the ranks (Size-16 for all the ranks, 16 generating vectors). This corresponds to the case of N=0.

Further reduction in the size of the rank-1 codebook is also possible. This is because some of the rank-1 vectors may also be contained (up to a scalar multiplication constant exp(j$\phi$)) in a 4×4 Householder matrix that corresponds to another rank-1 vector. For example, two ULA vectors can be contained within one Householder matrix associated with a ULA vector, up to a scalar multiplication constant. The example for ULA vectors is given below. Therefore, it is possible to use fewer generating vectors (and hence fewer rank-4 precoder matrices) to generated all the rank-1, rank-2, and rank-3 matrices. This results in a further reduction of the rank-4 codebook size without altering the rank-1, rank-2, and rank-3 codebooks up to a multiplicative constant.

Hence, starting from the regular Householder-based description, the following steps are needed to apply this rank-4 reduction. Start with one rank-1 vector v, the corresponding Householder generating vector u and the corresponding Householder matrix H(u). Then, identify if more rank-1 pre-coding vectors (other than those corresponding to a previous set of Householder matrices) are contained in H(u) up to a multiplicative constant and remove the corresponding rank-4 precoder matrices. The same multiplicative constant is applied to the rank-2 and rank-3 matrices to ensure the nested property and consistency. If no more exist, repeat the two steps above until all the rank-1 pre-coders are covered.

Any combination or variation of the above structures can be used to obtain a codebook design. The following constraints and criteria are used to generate additional codebook examples. Eight ULA vectors are included in the rank-1 codebook. The remaining rank-1 vectors are designed with a QPSK alphabet to minimize the UE complexity impact. All of the higher rank components corresponding to the eight ULA vectors are generated via the Householder operation described in the discussion associated with equation (15) above.

For each rank, only four matrices have an 8PSK alphabet (the four ULA vectors). The rest have a QPSK alphabet. For rank-4, the matrices in the rank-4 codebooks are obtained from the corresponding Householder matrices. Note that different rank-4 codebooks can be obtained by performing column permutation for each of the Householder matrices, wherein the nested property is strictly enforced and constant modulus is fully enforced.

All the codebook designs presented below ensure the best minimum chordal distance property for the above constraints. The minimum chordal distances for rank-1, 2 and 3 are 0.7071, 1.0, and 0.7071, respectively. In addition, some of the designs are chosen to ensure that the size-8 subset of the rank-1 codebook has a higher minimum chordal distance of 0.866. A first set of eight Householder generating vectors are shown in Table 4 below.

TABLE 4

| U Vector Index | First element | Second element | Third element | Fourth element |
|---|---|---|---|---|
| 1 | 1 | −1 | −1 | −1 |
| 2 | 1 | −j | 1 | j |
| 3 | 1 | 1 | −1 | 1 |
| 4 | 1 | j | 1 | −j |
| 5 | 1 | $\frac{-1-j}{\sqrt{2}}$ | −j | $\frac{1-j}{\sqrt{2}}$ |
| 6 | 1 | $\frac{1-j}{\sqrt{2}}$ | j | $\frac{-1-j}{\sqrt{2}}$ |
| 7 | 1 | $\frac{1+j}{\sqrt{2}}$ | −j | $\frac{-1+j}{\sqrt{2}}$ |
| 8 | 1 | $\frac{-1+j}{\sqrt{2}}$ | j | $\frac{1+j}{\sqrt{2}}$ |

In Codebook 4, $N_4$=0 (i.e., full Householder) wherein the size=(16,16,16,16) with rank-1 size-8 distance of 0.866, and Table 4A shows the Householder generating vectors.

TABLE 4A

| Uidx | Phase (degree) of elements 1 | Phase (degree) of elements 2 | Phase (degree) of elements 3 | Phase (degree) of elements 4 |
|---|---|---|---|---|
| 9  | 0 | 90   | −180 | −90  |
| 10 | 0 | 90   | 0    | 90   |
| 11 | 0 | −180 | −180 | 0    |
| 12 | 0 | −180 | 0    | −180 |
| 13 | 0 | −90  | −180 | 90   |
| 14 | 0 | −90  | 0    | −90  |
| 15 | 0 | 0    | −180 | −180 |
| 16 | 0 | 0    | 0    | 0    |

Table CB4 below summarizes column subsets for rank 1, 2 and 3 codebooks.

TABLE CB4

| Precoder Index | Rank1 Col 1 | Rank1 Uidx | Rank2 Col 1 | Rank2 Col 2 | Rank2 Uidx | Rank3 Col 1 | Rank3 Col 2 | Rank3 Col 3 | Rank3 Uidx |
|---|---|---|---|---|---|---|---|---|---|
| 1  | 1 | 1  | 1 | 2 | 1  | 1 | 2 | 3 | 1  |
| 2  | 1 | 2  | 1 | 3 | 2  | 1 | 3 | 4 | 2  |
| 3  | 1 | 3  | 1 | 3 | 3  | 1 | 3 | 2 | 3  |
| 4  | 1 | 4  | 1 | 4 | 4  | 1 | 4 | 3 | 4  |
| 5  | 1 | 5  | 1 | 3 | 5  | 1 | 3 | 2 | 5  |
| 6  | 1 | 6  | 1 | 2 | 6  | 1 | 2 | 4 | 6  |
| 7  | 1 | 7  | 1 | 2 | 7  | 1 | 2 | 4 | 7  |
| 8  | 1 | 8  | 1 | 3 | 8  | 1 | 3 | 2 | 8  |
| 9  | 1 | 9  | 1 | 2 | 9  | 1 | 2 | 3 | 9  |
| 10 | 1 | 10 | 1 | 3 | 10 | 1 | 3 | 2 | 10 |
| 11 | 1 | 11 | 1 | 2 | 11 | 1 | 2 | 3 | 11 |
| 12 | 1 | 12 | 1 | 4 | 12 | 1 | 4 | 3 | 12 |
| 13 | 1 | 13 | 1 | 2 | 13 | 1 | 2 | 4 | 13 |
| 14 | 1 | 14 | 1 | 4 | 14 | 1 | 4 | 2 | 14 |
| 15 | 1 | 15 | 1 | 2 | 15 | 1 | 2 | 3 | 15 |
| 16 | 1 | 16 | 1 | 4 | 16 | 1 | 4 | 3 | 16 |

In Codebook 5, $N_4=0$ (i.e., full Householder) wherein the size=(16,16,16,16) with rank-1 size-8 distance of 0.7071, and Table 4B shows the Householder generating vectors.

TABLE 4B

| Uidx | Phase (degree) of elements 1 | Phase (degree) of elements 2 | Phase (degree) of elements 3 | Phase (degree) of elements 4 |
|---|---|---|---|---|
| 9  | 0 | 0  | 0   | 180 |
| 10 | 0 | 90 | 0   | −90 |
| 11 | 0 | 0  | −90 | 90  |

TABLE 4B-continued

| Uidx | Phase (degree) of elements 1 | Phase (degree) of elements 2 | Phase (degree) of elements 3 | Phase (degree) of elements 4 |
|---|---|---|---|---|
| 12 | 0 | −90 | −90 | 0 |

Table CB5 below summarizes column subsets for rank 1, 2 and 3 codebooks

TABLE CB5

| Precoder Index | Rank1 Col 1 | Rank1 Uidx | Rank2 Col 1 | Rank2 Col 2 | Rank2 Uidx | Rank3 Col 1 | Rank3 Col 2 | Rank3 Col 3 | Rank3 Uidx |
|---|---|---|---|---|---|---|---|---|---|
| 1  | 1 | 1  | 1 | 3 | 1 | 1 | 3 | 4 | 1  |
| 2  | 1 | 2  | 1 | 4 | 2 | 1 | 3 | 4 | 2  |
| 3  | 1 | 3  | 1 | 2 | 3 | 1 | 2 | 4 | 3  |
| 4  | 1 | 4  | 1 | 4 | 4 | 1 | 3 | 4 | 4  |
| 5  | 3 | 1  | 3 | 4 | 1 | 3 | 4 | 2 | 1  |
| 6  | 3 | 2  | 3 | 2 | 2 | 3 | 1 | 2 | 2  |
| 7  | 3 | 3  | 3 | 4 | 3 | 3 | 4 | 1 | 3  |
| 8  | 3 | 4  | 3 | 1 | 4 | 3 | 1 | 2 | 4  |
| 9  | 1 | 9  | 1 | 3 | 9 | 1 | 2 | 3 | 9  |
| 10 | 1 | 10 | 1 | 2 | 10| 1 | 2 | 3 | 10 |
| 11 | 3 | 10 | 3 | 4 | 10| 3 | 4 | 2 | 10 |
| 12 | 1 | 11 | 1 | 3 | 11| 1 | 3 | 4 | 11 |
| 13 | 3 | 9  | 3 | 4 | 9 | 3 | 4 | 1 | 9  |
| 14 | 2 | 3  | 2 | 3 | 3 | 2 | 1 | 3 | 3  |
| 15 | 1 | 12 | 1 | 4 | 12| 1 | 2 | 4 | 12 |
| 16 | 2 | 9  | 2 | 1 | 9 | 2 | 1 | 4 | 9  |

In Codebook 6, $N_4=1$ wherein size=(16,16,16,13) with rank-1 size-8 distance of 0.866, and Table 4C shows the Householder generating vectors.

TABLE 4C

| Uidx | Phase (degree) of elements 1 | Phase (degree) of elements 2 | Phase (degree) of elements 3 | Phase (degree) of elements 4 |
|---|---|---|---|---|
| 9 | 0 | 90 | −180 | −90 |
| 10 | 0 | 90 | 0 | 90 |
| 11 | 0 | −90 | −180 | 90 |
| 12 | 0 | −90 | 0 | −90 |
| 13 | 0 | −180 | −180 | 0 |

Table CB6 summarizes the column subsets for rank 1, 2 and 3 codebooks.

TABLE CB6

| Precoder Index | Rank1 Col 1 | Rank1 Uidx | Rank2 Col 1 | Rank2 Col 2 | Rank2 Uidx | Rank3 Col 1 | Rank3 Col 2 | Rank3 Col 3 | Rank3 Uidx |
|---|---|---|---|---|---|---|---|---|---|
| 1 | 1 | 1 | 1 | 3 | 1 | 1 | 3 | 4 | 1 |
| 2 | 1 | 2 | 1 | 4 | 2 | 1 | 3 | 4 | 2 |
| 3 | 1 | 3 | 1 | 2 | 3 | 1 | 2 | 4 | 3 |
| 4 | 1 | 4 | 1 | 4 | 4 | 1 | 3 | 4 | 4 |
| 5 | 3 | 1 | 3 | 4 | 1 | 3 | 4 | 2 | 1 |
| 6 | 3 | 2 | 3 | 2 | 2 | 3 | 1 | 2 | 2 |
| 7 | 3 | 3 | 3 | 4 | 3 | 3 | 4 | 1 | 3 |
| 8 | 3 | 4 | 3 | 1 | 4 | 3 | 1 | 2 | 4 |
| 9 | 1 | 9 | 1 | 3 | 9 | 1 | 2 | 3 | 9 |
| 10 | 1 | 10 | 1 | 2 | 10 | 1 | 2 | 3 | 10 |
| 11 | 3 | 10 | 3 | 4 | 10 | 3 | 4 | 2 | 10 |
| 12 | 1 | 11 | 1 | 3 | 11 | 1 | 3 | 4 | 11 |
| 13 | 3 | 9 | 3 | 4 | 9 | 3 | 4 | 1 | 9 |
| 14 | 2 | 3 | 2 | 3 | 3 | 2 | 1 | 3 | 3 |
| 15 | 1 | 12 | 1 | 4 | 12 | 1 | 2 | 4 | 12 |
| 16 | 2 | 9 | 2 | 1 | 9 | 2 | 1 | 4 | 9 |

In Codebook 7, $N_4=1$ wherein the size=(16,16,16,13) with rank-1 size-8 distance of 0.866, and Table 4D shows the Householder generating vectors.

TABLE 4D

| Uidx | Phase (degree) of elements 1 | Phase (degree) of elements 2 | Phase (degree) of elements 3 | Phase (degree) of elements 4 |
|---|---|---|---|---|
| 9 | 0 | −180 | −180 | 0 |
| 10 | 0 | −180 | 0 | −180 |
| 11 | 0 | 0 | −180 | −180 |
| 12 | 0 | 0 | 0 | 0 |

TABLE 4D-continued

| Uidx | Phase (degree) of elements 1 | Phase (degree) of elements 2 | Phase (degree) of elements 3 | Phase (degree) of elements 4 |
|---|---|---|---|---|
| 13 | 0 | 90 | 0 | 90 |

Table CB7 summarizes the column subsets for rank 1, 2 and 3 codebooks.

TABLE CB7

| Precoder Index | Rank1 Col 1 | Rank1 Uidx | Rank2 Col 1 | Rank2 Col 2 | Rank2 Uidx | Rank3 Col 1 | Rank3 Col 2 | Rank3 Col 3 | Rank3 Uidx |
|---|---|---|---|---|---|---|---|---|---|
| 1 | 1 | 1 | 1 | 2 | 1 | 1 | 2 | 4 | 1 |
| 2 | 1 | 2 | 1 | 3 | 2 | 1 | 3 | 4 | 2 |
| 3 | 1 | 3 | 1 | 3 | 3 | 1 | 3 | 4 | 3 |
| 4 | 1 | 4 | 1 | 4 | 4 | 1 | 4 | 3 | 4 |
| 5 | 1 | 5 | 1 | 3 | 5 | 1 | 3 | 4 | 5 |
| 6 | 1 | 6 | 1 | 2 | 6 | 1 | 2 | 4 | 6 |
| 7 | 1 | 7 | 1 | 2 | 7 | 1 | 2 | 4 | 7 |
| 8 | 1 | 8 | 1 | 3 | 8 | 1 | 3 | 4 | 8 |
| 9 | 1 | 9 | 1 | 2 | 9 | 1 | 2 | 3 | 9 |
| 10 | 1 | 10 | 1 | 3 | 10 | 1 | 3 | 4 | 10 |
| 11 | 1 | 11 | 1 | 2 | 11 | 1 | 2 | 3 | 11 |
| 12 | 1 | 12 | 1 | 4 | 12 | 1 | 4 | 3 | 12 |
| 13 | 1 | 13 | 1 | 2 | 13 | 1 | 2 | 3 | 13 |
| 14 | 2 | 13 | 1 | 4 | 13 | 1 | 2 | 4 | 13 |
| 15 | 3 | 13 | 2 | 3 | 13 | 1 | 3 | 4 | 13 |
| 16 | 4 | 13 | 2 | 4 | 13 | 2 | 3 | 4 | 13 |

In Codebook 8, $N_4=1$ wherein the size=(16,16,16,13) with rank-1 size-8 distance of 0.7071, and Table 4E shows the Householder generating vectors. The constraint enforced here is that the four of the eight QPSK vectors in the rank-1 codebook come from one 4×4 Householder matrix. The rest can be chosen freely to optimize chordal distance.

TABLE 4E

| Uidx | Phase (degree) of elements 1 | Phase (degree) of elements 2 | Phase (degree) of elements 3 | Phase (degree) of elements 4 |
|---|---|---|---|---|
| 9  | 0 | 90  | 90  | 0   |
| 10 | 0 | 0   | 0   | 180 |
| 11 | 0 | 180 | −90 | −90 |
| 12 | 0 | −90 | 180 | −90 |

Table CB8 summarizes the column subsets for rank 1, 2 and 3 codebooks.

TABLE CB8

| Precoder Index | Rank1 Col 1 | Rank1 Uidx | Rank2 Col 1 | Rank2 Col 2 | Rank2 Uidx | Rank3 Col 1 | Rank3 Col 2 | Rank3 Col 3 | Rank3 Uidx |
|---|---|---|---|---|---|---|---|---|---|
| 1  | 1 | 1  | 1 | 3 | 1  | 1 | 3 | 4 | 1  |
| 2  | 1 | 2  | 1 | 2 | 2  | 1 | 2 | 4 | 2  |
| 3  | 1 | 3  | 1 | 3 | 3  | 1 | 3 | 4 | 3  |
| 4  | 1 | 4  | 1 | 4 | 4  | 1 | 2 | 4 | 4  |
| 5  | 3 | 1  | 3 | 4 | 1  | 3 | 4 | 2 | 1  |
| 6  | 3 | 2  | 3 | 2 | 2  | 3 | 4 | 2 | 2  |
| 7  | 3 | 3  | 3 | 4 | 3  | 3 | 4 | 2 | 3  |
| 8  | 3 | 4  | 3 | 1 | 4  | 3 | 4 | 1 | 4  |
| 9  | 1 | 9  | 1 | 4 | 9  | 1 | 3 | 4 | 9  |
| 10 | 2 | 9  | 2 | 1 | 9  | 2 | 1 | 3 | 9  |
| 11 | 3 | 9  | 3 | 4 | 9  | 3 | 4 | 2 | 9  |
| 12 | 4 | 9  | 4 | 2 | 9  | 4 | 2 | 1 | 9  |
| 13 | 1 | 10 | 1 | 2 | 10 | 1 | 2 | 3 | 10 |
| 14 | 1 | 11 | 1 | 2 | 11 | 1 | 2 | 4 | 11 |
| 15 | 1 | 12 | 1 | 3 | 12 | 1 | 2 | 3 | 12 |
| 16 | 4 | 12 | 4 | 2 | 12 | 4 | 2 | 1 | 12 |

In Codebook 9, $N_4=2$ wherein the size=(16,16,16,10) with rank-1 size-8 distance of 0.866, and Table 4F shows the Householder generating vectors.

TABLE 4F

| Uidx | Phase (degree) of elements 1 | Phase (degree) of elements 2 | Phase (degree) of elements 3 | Phase (degree) of elements 4 |
|---|---|---|---|---|
| 9  | 0 | 90   | −180 | −90 |
| 10 | 0 | −180 | −180 | 0   |

Table CB9 summarizes the column subsets for rank 1, 2 and 3 codebooks.

TABLE CB9

| Precoder Index | Rank1 Col 1 | Rank1 Uidx | Rank2 Col 1 | Rank2 Col 2 | Rank2 Uidx | Rank3 Col 1 | Rank3 Col 2 | Rank3 Col 3 | Rank3 Uidx |
|---|---|---|---|---|---|---|---|---|---|
| 1  | 1 | 1  | 1 | 3 | 1  | 1 | 3 | 2 | 1  |
| 2  | 1 | 2  | 1 | 3 | 2  | 1 | 3 | 2 | 2  |
| 3  | 1 | 3  | 1 | 2 | 3  | 1 | 2 | 3 | 3  |
| 4  | 1 | 4  | 1 | 2 | 4  | 1 | 2 | 4 | 4  |
| 5  | 1 | 5  | 1 | 2 | 5  | 1 | 2 | 3 | 5  |
| 6  | 1 | 6  | 1 | 4 | 6  | 1 | 4 | 2 | 6  |
| 7  | 1 | 7  | 1 | 3 | 7  | 1 | 3 | 2 | 7  |
| 8  | 1 | 8  | 1 | 3 | 8  | 1 | 3 | 2 | 8  |
| 9  | 1 | 9  | 1 | 2 | 9  | 1 | 2 | 3 | 9  |
| 10 | 2 | 9  | 2 | 3 | 9  | 1 | 2 | 4 | 9  |
| 11 | 3 | 9  | 3 | 4 | 9  | 1 | 3 | 4 | 9  |
| 12 | 4 | 9  | 1 | 2 | 10 | 2 | 3 | 4 | 9  |
| 13 | 1 | 10 | 1 | 3 | 10 | 1 | 2 | 3 | 10 |
| 14 | 2 | 10 | 1 | 4 | 10 | 1 | 2 | 4 | 10 |
| 15 | 3 | 10 | 2 | 4 | 10 | 1 | 3 | 4 | 10 |
| 16 | 4 | 10 | 3 | 4 | 10 | 2 | 3 | 4 | 10 |

In Codebook 10, $N_4=2$ wherein size=(16,16,16,10) with rank-1 size-8 distance of 0.866, and Table 4G shows the Householder generating vectors.

TABLE 4G

| Uidx | Phase (degree) of elements 1 | Phase (degree) of elements 2 | Phase (degree) of elements 3 | Phase (degree) of elements 4 |
|---|---|---|---|---|
| 9 | 0 | 90 | 0 | 90 |

TABLE 4G-continued

| Uidx | Phase (degree) of elements 1 | Phase (degree) of elements 2 | Phase (degree) of elements 3 | Phase (degree) of elements 4 |
|---|---|---|---|---|
| 10 | 0 | −180 | 0 | −180 |

Table CB10 summarizes the column subsets for rank 1, 2 and 3 codebooks.

TABLE CB10

| Precoder Index | Rank1 Col 1 | Rank1 Uidx | Rank2 Col 1 | Rank2 Col 2 | Rank2 Uidx | Rank3 Col 1 | Rank3 Col 2 | Rank3 Col 3 | Rank3 Uidx |
|---|---|---|---|---|---|---|---|---|---|
| 1 | 1 | 1 | 1 | 2 | 1 | 1 | 2 | 3 | 1 |
| 2 | 1 | 2 | 1 | 3 | 2 | 1 | 3 | 2 | 2 |
| 3 | 1 | 3 | 1 | 3 | 3 | 1 | 3 | 2 | 3 |
| 4 | 1 | 4 | 1 | 4 | 4 | 1 | 4 | 2 | 4 |
| 5 | 1 | 5 | 1 | 3 | 5 | 1 | 3 | 2 | 5 |
| 6 | 1 | 6 | 1 | 2 | 6 | 1 | 2 | 3 | 6 |
| 7 | 1 | 7 | 1 | 2 | 7 | 1 | 2 | 4 | 7 |
| 8 | 1 | 8 | 1 | 3 | 8 | 1 | 3 | 2 | 8 |
| 9 | 1 | 9 | 1 | 2 | 9 | 1 | 2 | 3 | 9 |
| 10 | 2 | 9 | 1 | 3 | 9 | 1 | 2 | 4 | 9 |
| 11 | 3 | 9 | 1 | 4 | 9 | 1 | 3 | 4 | 9 |
| 12 | 4 | 9 | 2 | 3 | 9 | 2 | 3 | 4 | 9 |
| 13 | 1 | 10 | 2 | 4 | 9 | 1 | 2 | 3 | 10 |
| 14 | 2 | 10 | 1 | 2 | 10 | 1 | 2 | 4 | 10 |
| 15 | 3 | 10 | 1 | 4 | 10 | 1 | 3 | 4 | 10 |
| 16 | 4 | 10 | 2 | 3 | 10 | 2 | 3 | 4 | 10 |

In Codebook 11, $N_4=2$ wherein the size=(16,16,16,10) with rank-1 size-8 distance of 0.7071, and Table 4H shows the Householder generating vectors. The constraint enforced here is that the eight QPSK vectors in the rank-1 codebook come from two 4×4 Householder matrices.

TABLE 4H

| Uidx | Phase (degree) of elements 1 | Phase (degree) of elements 2 | Phase (degree) of elements 3 | Phase (degree) of elements 7 |
|---|---|---|---|---|
| 9 | 0 | 0 | 0 | 180 |
| 10 | 0 | 90 | 0 | −90 |

| Uidx | Phase (degree) of element 1 | Phase (degree) of element 2 | Phase (degree) of element 3 | Phase (degree) of element 4 |
|---|---|---|---|---|
| 9 | 0 | −180 | −180 | 0 |
| 10 | 0 | −90 | −180 | 90 |
| 11 | 0 | 90 | −180 | −90 |
| 12 | 0 | −180 | 90 | −90 |
| 13 | 0 | 0 | −180 | −180 |
| 14 | 0 | −90 | −180 | −90 |
| 15 | 0 | 90 | 90 | −180 |
| 16 | 0 | −180 | 0 | −180 |

Table CB11 summarizes the column subsets for rank 1, 2 and 3 codebooks.

Table CB12 summarizes the column subsets for rank 1, 2, and 3 codebooks.

TABLE CB11

| Precoder Index | Rank1 Col 1 | Rank1 Uidx | Rank2 Col 1 | Rank2 Col 2 | Rank2 Uidx | Rank3 Col 1 | Rank3 Col 2 | Rank3 Col 3 | Rank3 Uidx |
|---|---|---|---|---|---|---|---|---|---|
| 1 | 1 | 1 | 1 | 2 | 1 | 1 | 2 | 4 | 1 |
| 2 | 1 | 2 | 1 | 4 | 2 | 1 | 3 | 4 | 2 |
| 3 | 1 | 3 | 1 | 4 | 3 | 1 | 2 | 4 | 3 |
| 4 | 1 | 4 | 1 | 2 | 4 | 1 | 2 | 3 | 4 |
| 5 | 3 | 1 | 3 | 1 | 1 | 3 | 1 | 2 | 1 |
| 6 | 3 | 2 | 3 | 2 | 2 | 3 | 4 | 2 | 2 |
| 7 | 3 | 3 | 3 | 4 | 3 | 3 | 4 | 2 | 3 |
| 8 | 3 | 4 | 3 | 2 | 4 | 3 | 4 | 2 | 4 |
| 9 | 1 | 9 | 1 | 2 | 9 | 1 | 2 | 4 | 9 |
| 10 | 2 | 9 | 2 | 3 | 9 | 2 | 1 | 3 | 9 |
| 11 | 3 | 9 | 3 | 1 | 9 | 3 | 4 | 1 | 9 |
| 12 | 4 | 9 | 4 | 3 | 9 | 4 | 3 | 2 | 9 |
| 13 | 1 | 10 | 1 | 2 | 10 | 1 | 2 | 4 | 10 |
| 14 | 2 | 10 | 2 | 4 | 10 | 2 | 4 | 3 | 10 |
| 15 | 3 | 10 | 3 | 2 | 10 | 3 | 1 | 2 | 10 |
| 16 | 4 | 10 | 4 | 3 | 10 | 4 | 3 | 1 | 10 |

In Codebook 12, $N_4=0$ (full Householder) wherein the size=(16,16,16,8) with rank-1 size-8 distance of 0.7071, and Table 4I shows the Householder generating vectors.

TABLE 4I

TABLE CB12

| Precoder Index | Rank1 Col 1 | Rank1 Uidx | Rank2 Col 1 | Rank2 Col 2 | Rank2 Uidx | Rank3 Col 1 | Rank3 Col 2 | Rank3 Col 3 | Rank3 Uidx |
|---|---|---|---|---|---|---|---|---|---|
| 1 | 1 | 1 | 1 | 3 | 1 | 1 | 3 | 4 | 1 |
| 2 | 1 | 2 | 1 | 2 | 2 | 1 | 2 | 4 | 2 |
| 3 | 1 | 3 | 1 | 2 | 3 | 1 | 2 | 4 | 3 |
| 4 | 1 | 4 | 1 | 2 | 4 | 1 | 2 | 3 | 4 |
| 5 | 1 | 5 | 1 | 4 | 5 | 1 | 3 | 4 | 5 |
| 6 | 1 | 6 | 1 | 4 | 6 | 1 | 3 | 4 | 6 |
| 7 | 1 | 7 | 1 | 4 | 7 | 1 | 3 | 4 | 7 |
| 8 | 1 | 8 | 1 | 3 | 8 | 1 | 3 | 4 | 8 |
| 9 | 1 | 9 | 1 | 3 | 9 | 1 | 2 | 3 | 9 |
| 10 | 1 | 10 | 1 | 2 | 10 | 1 | 2 | 3 | 10 |
| 11 | 1 | 11 | 1 | 2 | 11 | 1 | 2 | 4 | 11 |
| 12 | 1 | 12 | 1 | 3 | 12 | 1 | 3 | 4 | 12 |
| 13 | 1 | 13 | 1 | 2 | 13 | 1 | 2 | 3 | 13 |
| 14 | 1 | 14 | 1 | 4 | 14 | 1 | 2 | 4 | 14 |
| 15 | 1 | 15 | 1 | 4 | 15 | 1 | 2 | 4 | 15 |
| 16 | 1 | 16 | 1 | 2 | 16 | 1 | 2 | 3 | 16 |

In Codebook 13, $N_4=1$ wherein the size=(16,16,16,16) with rank-1 size-8 distance of 0.7071, and Table 4J shows the Householder generating vectors.

TABLE 4J

| Uidx | Phase (degree) of element 1 | Phase (degree) of element 2 | Phase (degree) of element 3 | Phase (degree) of element 4 |
|---|---|---|---|---|
| 9 | 0 | −90 | −90 | −180 |
| 10 | 0 | −90 | 90 | 0 |
| 11 | 0 | 90 | −90 | 0 |
| 12 | 0 | 90 | 90 | −180 |
| 13 | 0 | −180 | −180 | 0 |
| 14 | 0 | 0 | 90 | 90 |
| 15 | 0 | 90 | 0 | 90 |
| 16 | 0 | −90 | −180 | 90 |

TABLE 4K

| Uidx | Phase (degree) of element 1 | Phase (degree) of element 2 | Phase (degree) of element 3 | Phase (degree) of element 4 |
|---|---|---|---|---|
| 9 | 0 | −180 | −180 | 0 |
| 10 | 0 | −180 | 0 | −180 |
| 11 | 0 | 0 | −180 | −180 |
| 12 | 0 | 0 | 0 | 0 |
| 13 | 0 | −90 | −180 | 90 |
| 14 | 0 | −90 | 0 | −90 |
| 15 | 0 | 90 | −180 | −90 |
| 16 | 0 | 90 | 0 | 90 |

Table CB14 summarizes the column subsets for rank 1, 2, and 3 codebooks.

Table CB13 summarizes the column subsets for rank 1, 2, and 3 codebooks.

TABLE CB13

| Precoder Index | Rank1 Col 1 | Rank1 Uidx | Rank2 Col 1 | Rank2 Col 2 | Rank2 Uidx | Rank3 Col 1 | Rank3 Col 2 | Rank3 Col 3 | Rank3 Uidx |
|---|---|---|---|---|---|---|---|---|---|
| 1 | 1 | 1 | 1 | 3 | 1 | 1 | 3 | 4 | 1 |
| 2 | 1 | 2 | 1 | 3 | 2 | 1 | 3 | 4 | 2 |
| 3 | 1 | 3 | 1 | 2 | 3 | 1 | 2 | 4 | 3 |
| 4 | 1 | 4 | 1 | 2 | 4 | 1 | 2 | 4 | 4 |
| 5 | 1 | 5 | 1 | 2 | 5 | 1 | 2 | 4 | 5 |
| 6 | 1 | 6 | 1 | 4 | 6 | 1 | 2 | 4 | 6 |
| 7 | 1 | 7 | 1 | 4 | 7 | 1 | 2 | 4 | 7 |
| 8 | 1 | 8 | 1 | 3 | 8 | 1 | 2 | 3 | 8 |
| 9 | 1 | 9 | 1 | 4 | 9 | 1 | 3 | 4 | 9 |
| 10 | 1 | 10 | 1 | 2 | 10 | 1 | 2 | 4 | 10 |
| 11 | 1 | 11 | 1 | 2 | 11 | 1 | 2 | 4 | 11 |
| 12 | 1 | 12 | 1 | 3 | 12 | 1 | 3 | 4 | 12 |
| 13 | 1 | 13 | 1 | 2 | 13 | 1 | 2 | 3 | 13 |
| 14 | 1 | 14 | 1 | 2 | 14 | 1 | 2 | 4 | 14 |
| 15 | 1 | 15 | 1 | 3 | 15 | 1 | 2 | 3 | 15 |
| 16 | 1 | 16 | 1 | 3 | 16 | 1 | 3 | 4 | 16 |

In Codebook 14, $N_4=2$ wherein the size=(16,16,16,8) with rank-1 size-8 distance of 0.7071, and Table 4K shows the Householder generating vectors.

TABLE CB14

| Precoder Index | Rank1 Col 1 | Rank1 Uidx | Rank2 Col 1 | Rank2 Col 2 | Rank2 Uidx | Rank3 Col 1 | Rank3 Col 2 | Rank3 Col 3 | Rank3 Uidx |
|---|---|---|---|---|---|---|---|---|---|
| 1 | 1 | 1 | 1 | 2 | 1 | 1 | 2 | 4 | 1 |
| 2 | 1 | 2 | 1 | 4 | 2 | 1 | 2 | 4 | 2 |
| 3 | 1 | 3 | 1 | 3 | 3 | 1 | 3 | 4 | 3 |
| 4 | 1 | 4 | 1 | 2 | 4 | 1 | 2 | 4 | 4 |
| 5 | 1 | 5 | 1 | 4 | 5 | 1 | 3 | 4 | 5 |
| 6 | 1 | 6 | 1 | 2 | 6 | 1 | 2 | 3 | 6 |
| 7 | 1 | 7 | 1 | 4 | 7 | 1 | 2 | 4 | 7 |
| 8 | 1 | 8 | 1 | 4 | 8 | 1 | 2 | 4 | 8 |
| 9 | 1 | 9 | 1 | 2 | 9 | 1 | 2 | 4 | 9 |
| 10 | 1 | 10 | 1 | 4 | 10 | 1 | 2 | 4 | 10 |
| 11 | 1 | 11 | 1 | 3 | 11 | 1 | 2 | 3 | 11 |
| 12 | 1 | 12 | 1 | 2 | 12 | 1 | 2 | 3 | 12 |
| 13 | 1 | 13 | 1 | 2 | 13 | 1 | 2 | 4 | 13 |
| 14 | 1 | 14 | 1 | 3 | 14 | 1 | 3 | 4 | 14 |
| 15 | 1 | 15 | 1 | 4 | 15 | 1 | 3 | 4 | 15 |
| 16 | 1 | 16 | 1 | 2 | 16 | 1 | 2 | 4 | 16 |

In Codebook 15, $N_4=1$ wherein the size=(16,16,16,13) with rank-1 size-8 distance of 0.866, and Table 4L shows the Householder generating vectors.

TABLE 4L

| Uidx | Phase (degree) of element 1 | Phase (degree) of element 2 | Phase (degree) of element 3 | Phase (degree) of element 4 |
|---|---|---|---|---|
| 9 | 0 | 90 | −180 | −90 |
| 10 | 0 | 90 | 0 | 90 |
| 11 | 0 | −90 | −180 | 90 |
| 12 | 0 | −90 | 0 | −90 |
| 13 | 0 | −180 | −180 | 0 |

Table CB15 summarizes the column subsets for rank 1, 2, and 3 codebooks.

| Uidx | Phase (degree) of element 1 | Phase (degree) of element 2 | Phase (degree) of element 3 | Phase (degree) of element 4 |
|---|---|---|---|---|
| 9 | 0 | −180 | −180 | 0 |
| 10 | 0 | −180 | 0 | −180 |
| 11 | 0 | 0 | −180 | −180 |
| 12 | 0 | 0 | 0 | 0 |
| 13 | 0 | 90 | 0 | 90 |

Table CB16 summarizes the column subsets for rank 1, 2, and 3 codebooks.

TABLE CB15

| Precoder Index | Rank1 Col 1 | Rank1 Uidx | Rank2 Col 1 | Rank2 Col 2 | Rank2 Uidx | Rank3 Col 1 | Rank3 Col 2 | Rank3 Col 3 | Rank3 Uidx |
|---|---|---|---|---|---|---|---|---|---|
| 1 | 1 | 1 | 1 | 2 | 1 | 1 | 2 | 3 | 1 |
| 2 | 1 | 2 | 1 | 3 | 2 | 1 | 3 | 4 | 2 |
| 3 | 1 | 3 | 1 | 3 | 3 | 1 | 3 | 2 | 3 |
| 4 | 1 | 4 | 1 | 4 | 4 | 1 | 4 | 3 | 4 |
| 5 | 1 | 5 | 1 | 3 | 5 | 1 | 3 | 2 | 5 |
| 6 | 1 | 6 | 1 | 2 | 6 | 1 | 2 | 3 | 6 |
| 7 | 1 | 7 | 1 | 2 | 7 | 1 | 2 | 3 | 7 |
| 8 | 1 | 8 | 1 | 3 | 8 | 1 | 3 | 2 | 8 |
| 9 | 1 | 9 | 1 | 2 | 9 | 1 | 2 | 3 | 9 |
| 10 | 1 | 10 | 1 | 3 | 10 | 1 | 3 | 4 | 10 |
| 11 | 1 | 11 | 1 | 2 | 11 | 1 | 2 | 3 | 11 |
| 12 | 1 | 12 | 1 | 4 | 12 | 1 | 4 | 3 | 12 |
| 13 | 1 | 13 | 1 | 2 | 13 | 1 | 2 | 3 | 13 |
| 14 | 2 | 13 | 1 | 3 | 13 | 1 | 2 | 4 | 13 |
| 15 | 3 | 13 | 1 | 4 | 13 | 1 | 3 | 4 | 13 |
| 16 | 4 | 13 | 2 | 3 | 13 | 2 | 3 | 4 | 13 |

In Codebook 16, $N_4=1$ wherein the size=(16,16,16,13) with rank-1 size-8 distance of 0.866, and Table 4M shows the Householder generating vectors.

TABLE 4M

TABLE CB16

| Precoder Index | Rank1 Col 1 | Rank1 Uidx | Rank2 Col 1 | Rank2 Col 2 | Rank2 Uidx | Rank3 Col 1 | Rank3 Col 2 | Rank3 Col 3 | Rank3 Uidx |
|---|---|---|---|---|---|---|---|---|---|
| 1 | 1 | 1 | 1 | 2 | 1 | 1 | 2 | 4 | 1 |
| 2 | 1 | 2 | 1 | 3 | 2 | 1 | 3 | 4 | 2 |
| 3 | 1 | 3 | 1 | 3 | 3 | 1 | 3 | 4 | 3 |
| 4 | 1 | 4 | 1 | 4 | 4 | 1 | 4 | 3 | 4 |
| 5 | 1 | 5 | 1 | 3 | 5 | 1 | 3 | 4 | 5 |
| 6 | 1 | 6 | 1 | 2 | 6 | 1 | 2 | 4 | 6 |
| 7 | 1 | 7 | 1 | 2 | 7 | 1 | 2 | 4 | 7 |
| 8 | 1 | 8 | 1 | 3 | 8 | 1 | 3 | 4 | 8 |
| 9 | 1 | 9 | 1 | 2 | 9 | 1 | 2 | 3 | 9 |
| 10 | 1 | 10 | 1 | 3 | 10 | 1 | 3 | 4 | 10 |
| 11 | 1 | 11 | 1 | 2 | 11 | 1 | 2 | 3 | 11 |
| 12 | 1 | 12 | 1 | 4 | 12 | 1 | 4 | 3 | 12 |
| 13 | 1 | 13 | 1 | 2 | 13 | 1 | 2 | 3 | 13 |
| 14 | 2 | 13 | 1 | 4 | 13 | 1 | 2 | 4 | 13 |
| 15 | 3 | 13 | 2 | 3 | 13 | 1 | 3 | 4 | 13 |
| 16 | 4 | 13 | 2 | 4 | 13 | 2 | 3 | 4 | 13 |

In Codebook 17, $N_4=2$ wherein the size=(16,16,16,10) with rank-1 size-8 distance of 0.866, and Table 4N shows the Householder generating vectors.

TABLE 4N

| Uidx | Phase (degree) of element 1 | Phase (degree) of element 2 | Phase (degree) of element 3 | Phase (degree) of element 4 |
|---|---|---|---|---|
| 9 | 0 | 90 | −180 | −90 |
| 10 | 0 | −180 | −180 | 0 |

Table CB17 summarizes the column subsets for rank 1, 2, and 3 codebooks.

TABLE CB17

| Precoder Index | Rank1 Col 1 | Rank1 Uidx | Rank2 Col 1 | Rank2 Col 2 | Rank2 Uidx | Rank3 Col 1 | Rank3 Col 2 | Rank3 Col 3 | Rank3 Uidx |
|---|---|---|---|---|---|---|---|---|---|
| 1 | 1 | 1 | 1 | 3 | 1 | 1 | 3 | 2 | 1 |
| 2 | 1 | 2 | 1 | 3 | 2 | 1 | 3 | 2 | 2 |
| 3 | 1 | 3 | 1 | 2 | 3 | 1 | 2 | 3 | 3 |
| 4 | 1 | 4 | 1 | 2 | 4 | 1 | 2 | 4 | 4 |
| 5 | 1 | 5 | 1 | 2 | 5 | 1 | 2 | 3 | 5 |
| 6 | 1 | 6 | 1 | 4 | 6 | 1 | 4 | 2 | 6 |
| 7 | 1 | 7 | 1 | 3 | 7 | 1 | 3 | 2 | 7 |
| 8 | 1 | 8 | 1 | 3 | 8 | 1 | 3 | 2 | 8 |
| 9 | 1 | 9 | 1 | 2 | 9 | 1 | 2 | 3 | 9 |
| 10 | 2 | 9 | 2 | 3 | 9 | 1 | 2 | 4 | 9 |
| 11 | 3 | 9 | 3 | 4 | 9 | 1 | 3 | 4 | 9 |
| 12 | 4 | 9 | 1 | 2 | 10 | 2 | 3 | 4 | 9 |
| 13 | 1 | 10 | 1 | 3 | 10 | 1 | 2 | 3 | 10 |
| 14 | 2 | 10 | 1 | 4 | 10 | 1 | 2 | 4 | 10 |
| 15 | 3 | 10 | 2 | 4 | 10 | 1 | 3 | 4 | 10 |
| 16 | 4 | 10 | 3 | 4 | 10 | 2 | 3 | 4 | 10 |

In Codebook 18, $N_4=2$ wherein the size=(16,16,16,10) with rank-1 size-8 distance of 0.866, and Table 4P shows the Householder generating vectors.

TABLE 4P

| Uidx | Phase (degree) of element 1 | Phase (degree) of element 2 | Phase (degree) of element 3 | Phase (degree) of element 4 |
|---|---|---|---|---|
| 9 | 0 | 90 | 0 | 90 |
| 10 | 0 | −180 | 0 | −180 |

Table CB18 summarizes the column subsets for rank 1, 2, and 3 codebooks.

TABLE CB18

| Precoder Index | Rank1 Col 1 | Rank1 Uidx | Rank2 Col 1 | Rank2 Col 2 | Rank2 Uidx | Rank3 Col 1 | Rank3 Col 2 | Rank3 Col 3 | Rank3 Uidx |
|---|---|---|---|---|---|---|---|---|---|
| 1 | 1 | 1 | 1 | 2 | 1 | 1 | 2 | 3 | 1 |
| 2 | 1 | 2 | 1 | 3 | 2 | 1 | 3 | 2 | 2 |
| 3 | 1 | 3 | 1 | 3 | 3 | 1 | 3 | 2 | 3 |
| 4 | 1 | 4 | 1 | 4 | 4 | 1 | 4 | 2 | 4 |
| 5 | 1 | 5 | 1 | 3 | 5 | 1 | 3 | 2 | 5 |
| 6 | 1 | 6 | 1 | 2 | 6 | 1 | 2 | 3 | 6 |

TABLE CB18-continued

| Precoder Index | Rank1 Col 1 | Rank1 Uidx | Rank2 Col 1 | Rank2 Col 2 | Rank2 Uidx | Rank3 Col 1 | Rank3 Col 2 | Rank3 Col 3 | Rank3 Uidx |
|---|---|---|---|---|---|---|---|---|---|
| 7 | 1 | 7 | 1 | 2 | 7 | 1 | 2 | 4 | 7 |
| 8 | 1 | 8 | 1 | 3 | 8 | 1 | 3 | 2 | 8 |
| 9 | 1 | 9 | 1 | 2 | 9 | 1 | 2 | 3 | 9 |
| 10 | 2 | 9 | 1 | 3 | 9 | 1 | 2 | 4 | 9 |
| 11 | 3 | 9 | 1 | 4 | 9 | 1 | 3 | 4 | 9 |
| 12 | 4 | 9 | 2 | 3 | 9 | 2 | 3 | 4 | 9 |
| 13 | 1 | 10 | 2 | 4 | 9 | 1 | 2 | 3 | 10 |
| 14 | 2 | 10 | 1 | 2 | 10 | 1 | 2 | 4 | 10 |
| 15 | 3 | 10 | 1 | 4 | 10 | 1 | 3 | 4 | 10 |
| 16 | 4 | 10 | 2 | 3 | 10 | 2 | 3 | 4 | 10 |

An alternative Householder-based representation for rank-4 codebook size reduction may be considered. Some examples of the reduced-size design for rank-4 are given. First, the first eight ULA vectors can be generated from the following four generating vectors shown in Table 5.

TABLE 5

| U Vector Index | First element | Second element | Third element | Fourth element |
|---|---|---|---|---|
| 1 | 1 | $-1$ | $-1$ | $-1$ |
| 2 | 1 | $-j$ | 1 | $j$ |
| 3 | 1 | $\frac{-1-j}{\sqrt{2}}$ | $-j$ | $\frac{1-j}{\sqrt{2}}$ |
| 4 | 1 | $\frac{1-j}{\sqrt{2}}$ | $j$ | $\frac{-1-j}{\sqrt{2}}$ |

For the rank-1 codebook, the eight ULA vectors can then be generated as shown in Table 6 (see equation (14) for the ULA definition).

TABLE 6

| Rank-1 ULA vector | Column subset | U vector Idx | Multiplicative scalar |
|---|---|---|---|
| V0 | 1 | 1 | 1 |
| V1 | 1 | 2 | 1 |
| V2 | 1 | 3 | 1 |
| V3 | 1 | 4 | 1 |
| V4 | 3 | 1 | 1 |
| V5 | 3 | 2 | $-1$ |
| V6 | 3 | 3 | $-j$ |
| V7 | 3 | 4 | $j$ |

The multiplicative scalar is used to modify each of the rank-1 vectors. For example, the $7^{th}$ rank-1 vector V6 needs to be multiplied with $-j$ (all the four vector elements need to be multiplied by $-j$) to enable the rank-4 codebook size reduction while maintaining the nested property. Hence, only four rank-4 pre-coding matrices are needed (corresponding to the four Householder generating vectors) as opposed to eight for the regular Householder construction. The same can be applied to the other codebook elements. In fact, the same can be applied to all the examples given above.

Figure 3:
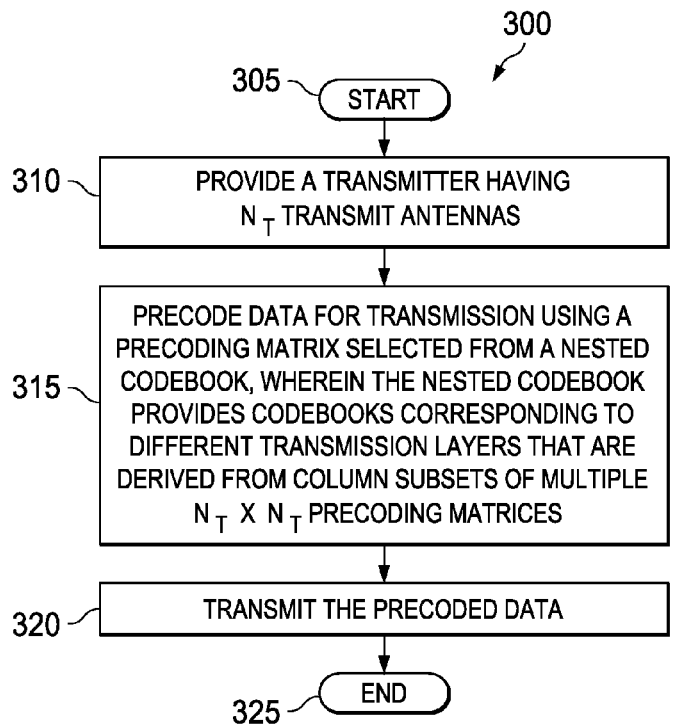
FIG. 3 illustrates a flow diagram of a method of operating a transmitter as provided by one embodiment of the disclosure.

FIG. 3 illustrates a flow diagram of a method 300 of operating a transmitter as provided by one embodiment of the disclosure. The method 300 is intended for use with a transmitter employing $N_T$ transmit antennas and starts in a step 305. A transmitter is provided in a step 310. Then, data for transmission is preceded using a preceding matrix selected from a nested codebook, wherein the nested codebook provides codebooks corresponding to different transmission layers that are derived from column subsets of multiple $N_T \times N_T$ preceding matrices in a step 315.

In one embodiment, the nested codebook maximizes the minimum chordal distance. In another embodiment, each codebook contains at least one matrix with constant modulus elements, and the constant modulus elements belong to a QPSK constellation or an 8PSK constellation. Additionally, the nested codebook is based on a combination of a representation of the discrete Fourier Transform (DFT) matrix and a Householder matrix.

In one embodiment, the nested codebook contains at least one matrix generated from a diagonal rotation matrix and a discrete Fourier Transform (DFT) matrix. Correspondingly, diagonal elements of the diagonal rotation matrix belong to QPSK or 8PSK constellations.

In one embodiment, the nested codebook is derived from Householder matrices. Correspondingly, at least one of the Householder matrices has a column proportional to uniform linear array (ULA) vectors. Additionally, a codebook corresponding to a number of transmission layers contains at least one matrix having a column proportional to ULA vectors. The preceded data is transmitted in a step 320, and the method 300 ends in a step 325.

Figure 4:
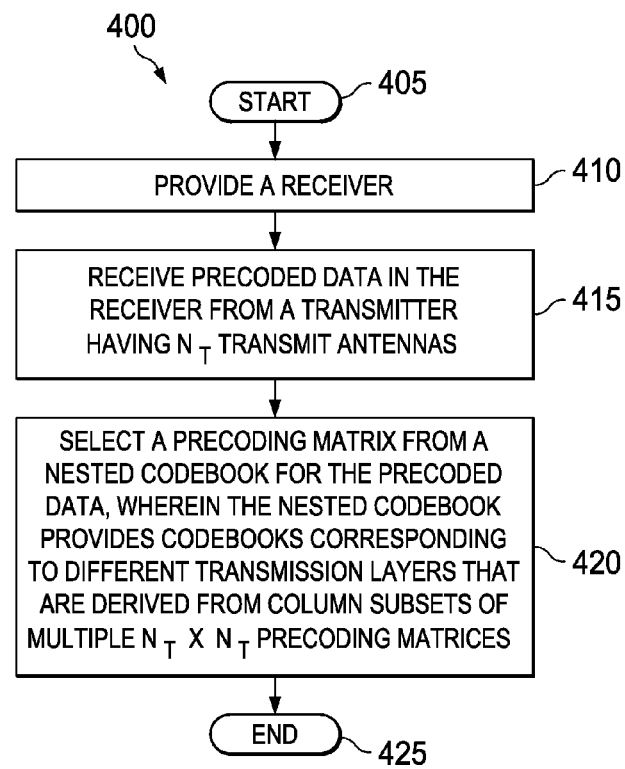
FIG. 4 illustrates a flow diagram of a method of operating a receiver as provided by one embodiment of the disclosure.

FIG. 4 illustrates a flow diagram of a method 400 of operating a receiver as provided by one embodiment of the disclosure. The method 400 starts in a step 405. In a step 410, a receiver is provided, and preceded data is received in the receiver from a transmitter having $N_T$ transmit antennas, in a step 415. A preceding matrix is selected from a nested codebook for the preceded data, wherein the nested codebook provides codebooks corresponding to different transmission layers that are derived from column subsets of multiple $N_T \times N_T$ preceding matrices, in a step 420.

In one embodiment, the nested codebook maximizes the minimum chordal distance. In another embodiment, each codebook contains at least one matrix with constant modulus elements, and the constant modulus elements belong to a QPSK constellation or an 8PSK constellation. Additionally, the nested codebook is based on a combination of a representation of the discrete Fourier Transform (DFT) matrix and a Householder matrix.

In one embodiment, the nested codebook contains at least one matrix generated from a diagonal rotation matrix and a discrete Fourier Transform (DFT) matrix. Correspondingly, diagonal elements of the diagonal rotation matrix belong to QPSK or 8PSK constellations.

In one embodiment, the nested codebook is derived from Householder matrices. Correspondingly, at least one of the Householder matrices has a column proportional to uniform linear array (ULA) vectors. Additionally, a codebook corresponding to a number of transmission layers contains at least one matrix having a column proportional to ULA vectors. The method 400 ends in a step 425.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which the disclosure relates will appreciate that other and further additions, deletions, substitutions and modifications may be made to the described example embodiments without departing from the disclosure.

What is claimed is:

1. A transmitter for use with multiple transmit antennas, comprising:
    a precoder unit configured to precode data for transmission using a precoding matrix selected from a codebook, corresponding to different transmission layers, wherein the codebook is derived from column subsets of multiple N by N precoding matrices, wherein N is the number of transmit antennas, wherein each of said precoding matrices is derived from the Householder transformation of a length N constant modulus vector; and
    a transmit unit configured to transmit the precoded data.

2. The transmitter as recited in claim 1 wherein each codebook contains at least one matrix with constant modulus elements.

3. The transmitter as recited in claim 2 wherein the constant modulus elements belong to a QPSK constellation or an 8PSK constellation.

4. The transmitter as recited in claim 1 wherein the codebook maximizes the minimum chordal distance.

5. The transmitter as recited in claim 1 wherein the codebook contains at least one matrix generated from a diagonal rotation matrix and a discrete Fourier Transform (DFT) matrix.

6. A transmitter for use with multiple transmit antennas, comprising:
    a precoder unit configured to precode data for transmission using a precoding matrix selected from a codebook, corresponding to different transmission layers, wherein the codebook is derived from column subsets of multiple N by N precoding matrices, wherein N is the number of transmit antennas, wherein each of said precoding matrices is derived from the Householder transformation of a length N constant modulus vector, wherein the codebook contains at least one matrix generated from a diagonal rotation matrix and a discrete Fourier Transform (DFT) matrix, wherein diagonal elements of the diagonal rotation matrix belong to QPSK or 8PSK constellations; and
    a transmit unit configured to transmit the precoded data.

7. The transmitter as recited in claim 1 wherein said number of N transmit antennas is 4.

8. A transmitter for use with multiple transmit antennas, comprising:
    a precoder unit configured to precode data for transmission using a precoding matrix selected from a codebook, corresponding to different transmission layers, wherein the codebook is derived from column subsets of multiple N by N precoding matrices, wherein N is the number of transmit antennas, wherein each of said precoding matrices is derived from the Householder transformation of a length N constant modulus vector, wherein at least one of the Householder matrices has a column proportional to uniform linear array (ULA) vectors; and
    a transmit unit configured to transmit the preceded data.

9. A transmitter for use with multiple transmit antennas, comprising:
    a precoder unit configured to precede data for transmission using a precoding matrix selected from a codebook, corresponding to different transmission layers, wherein the codebook is derived from column subsets of multiple N by N preceding matrices, wherein N is the number of transmit antennas, wherein each of said preceding matrices is derived from the Householder transformation of a length N constant modulus vector, wherein at least one of the Householder matrices has a column proportional to uniform linear array (ULA) vectors, wherein a codebook corresponding to a number of transmission layers contains at least one matrix having a column proportional to ULA vectors; and
    a transmit unit configured to transmit the preceded data.

10. The transmitter as recited in claim 1 wherein the codebook is based on a combination of a representation of the discrete Fourier Transform (DFT) matrix and a Householder matrix.

11. A method of operating a transmitter for use with multiple transmit antennas, comprising:
    preceding data for transmission using a preceding matrix selected from a codebook, corresponding to different transmission layers, wherein the codebook is derived from column subsets of multiple N by N preceding matrices, wherein N is the number of transmit antennas, wherein each of said precoding matrices is derived from the Householder transformation of a length N constant modulus vector; and
    a transmit unit configured to transmit the preceded data.

12. The method as recited in claim 11 wherein each codebook contains at least one matrix with constant modulus elements.

13. The method as recited in claim 12 wherein the constant modulus elements belong to a QPSK constellation or an 8PSK constellation.

14. The method as recited in claim 11 wherein the codebook maximizes the minimum chordal distance.

15. The method as recited in claim 11 wherein the codebook contains at least one matrix generated from a diagonal rotation matrix and a discrete Fourier Transform (DFT) matrix.

16. A method of operating a transmitter for use with multiple transmit antennas, comprising:
    precoding data for transmission using a precoding matrix selected from a codebook, corresponding to different transmission layers, wherein the codebook is derived from column subsets of multiple N by N precoding matrices, wherein N is the number of transmit antennas, wherein each of said precoding matrices is derived from the Householder transformation of a length N constant modulus vector, wherein the codebook contains at least one matrix generated from a diagonal rotation matrix and a discrete Fourier Transform (DFT) matrix, wherein diagonal elements of the diagonal rotation matrix belong to QPSK or 8PSK constellations; and
    a transmit unit configured to transmit the preceded data.

17. The method as recited in claim 11 wherein said number of N transmit antennas is 4.

18. A method of operating a transmitter for use with multiple transmit antennas, comprising:
    precoding data for transmission using a precoding matrix selected from a codebook, corresponding to different transmission layers, wherein the codebook is derived from column subsets of multiple N by N precoding matrices, wherein N is the number of transmit antennas, wherein each of said precoding matrices is derived from the Householder transformation of a length N constant modulus vector, wherein at least one of the Householder matrices has a column proportional to uniform linear array (ULA) vectors; and a transmit unit configured to transmit the precoded data.

19. A method of operating a transmitter for use with multiple transmit antennas, comprising:

precoding data for transmission using a precoding matrix selected from a codebook, corresponding to different transmission layers, wherein the codebook is derived from column subsets of multiple N by N precoding matrices, wherein N is the number of transmit antennas, wherein each of said precoding matrices is derived from the Householder transformation of a length N constant modulus vector, wherein at least one of the Householder matrices has a column proportional to uniform linear array (ULA) vectors, wherein a codebook corresponding to a number of transmission layers contains at least one matrix having a column proportional to ULA vectors; and a transmit unit configured to transmit the precoded data.

20. The method as recited in claim 11 wherein the codebook is based on a combination of a representation of the discrete Fourier Transform (DFT) matrix and a Householder matrix.

21. A receiver, comprising:

a receive unit configured to receive precoded data from multiple transmit antennas; and a precoder selection unit configured to select a precoding matrix from a codebook for the precoded data, wherein the codebook corresponding to different transmission layers is derived from column subsets of multiple N by N precoding matrices, wherein N is the number of transmit antennas, wherein each of said precoding matrices is derived from the Householder transformation of a length N constant modulus vector.

22. The receiver as recited in claim 21 wherein each codebook contains at least one matrix with constant modulus elements.

23. The receiver as recited in claim 22 wherein the constant modulus elements belong to a QPSK constellation or an 8PSK constellation.

24. The receiver as recited in claim 21 wherein the codebook maximizes the minimum chordal distance.

25. The receiver as recited in claim 21 wherein the codebook contains at least one matrix generated from a diagonal rotation matrix and a discrete Fourier Transform (DFT) matrix.

26. A receiver, comprising:

a receive unit configured to receive precoded data from multiple transmit antennas; and a precoder selection unit configured to select a precoding matrix from a codebook for the precoded data, wherein the codebook corresponding to different transmission layers is derived from column subsets of multiple N by N precoding matrices, wherein N is the number of transmit antennas, wherein each of said precoding matrices is derived from the Householder transformation of a length N constant modulus vector, wherein the codebook contains at least one matrix generated from a diagonal rotation matrix and a discrete Fourier Transform (DFT) matrix, wherein diagonal elements of the diagonal rotation matrix belong to QPSK or 8PSK constellations.

27. The receiver as recited in claim 21 wherein N is equal to 4.

28. A receiver, comprising:

a receive unit configured to receive precoded data from multiple transmit antennas; and a precoder selection unit configured to select a precoding matrix from a codebook for the precoded data, wherein the codebook corresponding to different transmission layers is derived from column subsets of multiple N by N precoding matrices, wherein N is the number of transmit antennas, wherein each of said precoding matrices is derived from the Householder transformation of a length N constant modulus vector, wherein at least one of the Householder matrices has a column proportional to uniform linear array (ULA) vectors.

29. A receiver, comprising:

a receive unit configured to receive precoded data from multiple transmit antennas; and a precoder selection unit configured to select a precoding matrix from a codebook for the precoded data, wherein the codebook corresponding to different transmission layers is derived from column subsets of multiple N by N precoding matrices, wherein N is the number of transmit antennas, wherein each of said precoding matrices is derived from the Householder transformation of a length N constant modulus vector, wherein at least one of the Householder matrices has a column proportional to uniform linear array (ULA) vectors, wherein a codebook corresponding to a number of transmission layers contains at least one matrix having a column proportional to ULA vectors.

30. The receiver as recited in claim 21 wherein the codebook is based on a combination of a representation of the discrete Fourier Transform (DPT) matrix and a Householder matrix.

31. A method of operating a receiver, comprising:

receiving precoded data from multiple transmit antennas; and selecting a precoding matrix from a codebook for the precoded data, wherein the codebook corresponds to different transmission layers that are derived from column subsets of multiple N by N precoding matrices, wherein N is the number of transmit antennas, wherein each of said precoding matrices is derived from the Householder transformation of a length N constant modulus vector.

32. The method as recited in claim 31 wherein each codebook contains at least one matrix with constant modulus elements.

33. The method as recited in claim 32 wherein the constant modulus elements belong to a QPSK constellation or an 8PSK constellation.

34. The method as recited in claim 31 wherein the codebook maximizes the minimum chordal distance.

35. The method as recited in claim 31 wherein the codebook contains at least one matrix generated from a diagonal rotation matrix and a discrete Fourier Transform (DFT) matrix.

36. A method of operating a receiver, comprising:

receiving precoded data from multiple transmit antennas; and selecting a precoding matrix from a codebook for the precoded data, wherein the codebook corresponds to different transmission layers that are derived from column subsets of multiple N by N precoding matrices, wherein N is the number of transmit antennas, wherein each of said precoding matrices is derived from the Householder transformation of a length N constant modulus vector, wherein the codebook contains at least one matrix generated from a diagonal rotation matrix and a discrete Fourier Transform (DFT) matrix, wherein diagonal elements of the diagonal rotation matrix belong to QPSK or 8PSK constellations.

37. The method as recited in claim 31 wherein N is equal to 4.

38. A method of operating a receiver, comprising:
receiving precoded data from multiple transmit antennas; and
selecting a precoding matrix from a codebook for the precoded data, wherein the codebook corresponds to different transmission layers that are derived from column subsets of multiple N by N precoding matrices, wherein N is the number of transmit antennas, wherein each of said precoding matrices is derived from the Householder transformation of a length N constant modulus vector, wherein at least one of the Householder matrices has a column proportional to uniform linear array (ULA) vectors.

39. A method of operating a receiver, comprising:
receiving precoded data from multiple transmit antennas; and
selecting a precoding matrix from a codebook for the precoded data, wherein the codebook corresponds to different transmission layers that are derived from column subsets of multiple N by N precoding matrices, wherein N is the number of transmit antennas, wherein each of said precoding matrices is derived from the Householder transformation of a length N constant modulus vector, wherein at least one of the Householder matrices has a column proportional to uniform linear array (ULA) vectors, wherein a codebook corresponding to a number of transmission layers contains at least one matrix having a column proportional to ULA vectors.

40. The method as recited in claim 31 wherein the codebook is based on a combination of a representation of the discrete Fourier Transform (DFT) matrix and a Householder matrix.

* * * * *